(12) United States Patent
Cho et al.

(10) Patent No.: US 7,242,661 B2
(45) Date of Patent: Jul. 10, 2007

(54) DIELECTRIC INFORMATION APPARATUS, TAPE-LIKE MEDIUM RECORDING/REPRODUCING APPARATUS AND DISC-LIKE MEDIUM RECORDING/REPRODUCING APPARATUS

(75) Inventors: Yasuo Cho, 4-5-304, Komegafukuro 2-chome, Aoba-ku, Sendai-shi, Miyagi (JP); Atsushi Onoe, Saitama (JP)

(73) Assignees: Pioneer Corporation, Tokyo (JP); Yasuo Cho, Miyagi (JP)

( * ) Notice: Subject to any disclaimer, the term of this patent is extended or adjusted under 35 U.S.C. 154(b) by 437 days.

(21) Appl. No.: 10/237,988

(22) Filed: Sep. 10, 2002

(65) Prior Publication Data

US 2003/0053400 A1    Mar. 20, 2003

(30) Foreign Application Priority Data

Sep. 10, 2001  (JP) ............................ 2001-274346

(51) Int. Cl.
*G11B 7/00* (2006.01)
(52) U.S. Cl. ..................... 369/126; 369/101
(58) Field of Classification Search ................ 369/126, 369/101
See application file for complete search history.

(56) References Cited

U.S. PATENT DOCUMENTS

| 4,320,491 | A | * | 3/1982 | Rustman | 369/126 |
| 4,489,278 | A | * | 12/1984 | Sawazaki | 324/457 |
| 5,418,029 | A | | 5/1995 | Yamamoto et al. | 428/64.2 |
| 5,481,527 | A | * | 1/1996 | Kasanuki et al. | 369/126 |
| 5,488,602 | A | | 1/1996 | Yamano et al. | 369/126 |
| 5,646,932 | A | | 7/1997 | Kuribayashi et al. | 369/126 |
| 5,751,685 | A | * | 5/1998 | Yi | 369/126 |
| 5,808,977 | A | | 9/1998 | Koyanagi et al. | 369/127 |

(Continued)

FOREIGN PATENT DOCUMENTS

GB      1 484 256      9/1977

(Continued)

OTHER PUBLICATIONS

62th Japan Society of Applied Physics Lecture Meeting (Sep. 2001 Aichi Institute of Technology) 12p-ZR-2.

(Continued)

*Primary Examiner*—Wayne Young
*Assistant Examiner*—Van T. Pham
(74) *Attorney, Agent, or Firm*—Nixon & Vanderhye, PC

(57) ABSTRACT

An example dielectric information apparatus is provided with a plurality of electrodes for recording information in a small area of a dielectric substance and an earthed electrode. The electrodes are placed such that the dielectric substance is sandwiched therebetween. The dielectric information apparatus reads out the information recorded in the small area of a dielectric thin film by applying alternating current signals to the first electrodes. The polarization direction of the small area and the direction of an applied electric field decide the dielectric constant of the small area, and the oscillation frequency of an oscillator is determined by a capacitance Cs corresponding to the dielectric constant. An oscillation signal of the oscillator is demodulated at an FM demodulator, and the information is detected from the demodulated signal at a signal detector. When recording, record signals are applied to the first electrodes, and the polarization direction is set to correspond to the record signals.

15 Claims, 9 Drawing Sheets

U.S. PATENT DOCUMENTS

| | | | |
|---|---|---|---|
| 5,914,920 A | 6/1999 | Yokogawa | 369/275.3 |
| 5,946,284 A | 8/1999 | Chung et al. | 369/126 |
| 6,197,989 B1 | 3/2001 | Furukawa et al. | 556/450 |
| 6,477,132 B1 | 11/2002 | Azuma et al. | 369/126 |
| 6,510,130 B2 | 1/2003 | Hayashi et al. | 369/275.3 |
| 6,515,957 B1 | 2/2003 | Newns et al. | 369/126 |
| 6,653,630 B2 | 11/2003 | Rosenman et al. | 250/306 |
| 6,762,402 B2 | 7/2004 | Choi et al. | 250/234 |
| 6,841,220 B2 | 1/2005 | Onoe et al. | 428/66.7 |
| 6,912,193 B2 | 6/2005 | Cho et al. | 369/126 |
| 6,965,545 B2 | 11/2005 | Hino et al. | 369/13.54 |
| 7,065,033 B2 | 6/2006 | Onoe et al. | 369/126 |
| 7,149,180 B2 | 12/2006 | Onoe et al. | 369/276 |
| 2002/0105249 A1 | 8/2002 | Yoshida et al. | 310/311 |
| 2002/0118906 A1 | 8/2002 | Onoe | 385/14 |
| 2002/0131669 A1 | 9/2002 | Onoe et al. | 385/14 |
| 2003/0021213 A1* | 1/2003 | Hagiwara | 369/101 |
| 2003/0053400 A1 | 3/2003 | Cho et al. | 369/126 |
| 2004/0027935 A1 | 2/2004 | Cho et al. | 369/126 |
| 2004/0042351 A1 | 3/2004 | Onoe et al. | 369/13.01 |
| 2004/0090903 A1 | 5/2004 | Cho et al. | 369/126 |
| 2004/0105373 A1 | 6/2004 | Maeda et al. | 369/101 |
| 2004/0105380 A1 | 6/2004 | Cho et al. | 369/126 |
| 2004/0114913 A1 | 6/2004 | Kume | 386/125 |
| 2004/0252621 A1 | 12/2004 | Cho et al. | 369/126 |
| 2004/0263185 A1 | 12/2004 | Cho et al. | 324/636 |
| 2005/0047288 A1 | 3/2005 | Maeda et al. | 369/53.25 |
| 2005/0098532 A1 | 5/2005 | Onoe et al. | 216/22 |
| 2005/0099895 A1 | 5/2005 | Maeda et al. | 369/13.01 |
| 2005/0122886 A1 | 6/2005 | Takahashi et al. | 369/126 |

FOREIGN PATENT DOCUMENTS

| | | |
|---|---|---|
| JP | 56-107338 | 8/1981 |
| JP | 57-200956 | 12/1982 |
| JP | 08-075806 | 3/1996 |
| JP | 10-334525 | 12/1998 |
| JP | 2003085969 | 3/2003 |

OTHER PUBLICATIONS

Kazuta et al, "Determination of crystal polarities of piezoelectric thin film using scanning nonlinear dielectric microscopy", Journal of European Ceramic Society 21 (2001) 1581-1584.

The Institution of Electrical Engineers, Stevenage, GB; Jun. 1, 2002; Hiranaga et al, "Nano-sized inverted domain formation in stoichiometric LiTaO/sub3/single crystal using Scanning Nonlinear Dielectric Microscopy", XP002292217.

Cho et al, "Scanning nonlinear dielectric microscopy with nanometer resolution", Journal of European Ceramic Society 21 (2001) 2131-2134.

Cho et al., Nano domain engineering using scanning nonlinear dielectric microscopy, Oct. 29, 2001, IEE-NANO 2001, pp. 352-357.

* cited by examiner

DIELECTRIC INFORMATION APPARATUS, TAPE-LIKE MEDIUM RECORDING/REPRODUCING APPARATUS AND DISC-LIKE MEDIUM RECORDING/REPRODUCING APPARATUS

BACKGROUND OF THE INVENTION

1. Field of the Invention

The present invention relates to dielectric information apparatus such as a recording apparatus for recording information in a small area of a dielectric substance, a reproducing apparatus for reproducing information recorded in a small area of a dielectric substance, and a recording/reproducing apparatus for recording information in and reproducing it from a small area of a dielectric substance.

2. Description of the Related Art

In recent years, many kinds of ferroelectric materials and piezoelectric materials have been developed and used for a supersonic, an optical device and a memory and the like. In association with it, a development of methods of measuring a residual polarization distribution of the ferroelectric material and a local anisotropy of the piezoelectric material has been advanced. With regard to the development in this field, the inventors of this application have developed a scanning nonlinear dielectric microscopy (SNDM) as a technique for a purely electrical detection of a polarization distribution of a material and a local anisotropy without any disturbance of a shield effect caused by free charges disposed on a surface.

The SNDM is the technique for detecting the condition of the polarization and the local anisotropy from a distribution measurement of a nonlinear dielectric constant of a material. As the technique of the SNDM, the development has been successively advanced such as a distribution constant type probe using a coaxial resonator and a small concentrated constant type probe using an LC resonator. The resolution of detection reaches a nano-meter order and further reaches a sub-nano-meter order. Moreover, quantitative measurement of linear/non-linear dielectric constant distributions has been able to be realized.

In this way, according to the SNDM, nondestructive measurement can be performed on the polarization distribution of a dielectric substance in an extremely small area. On the other hand, according to the SNDM, the polarization can be controlled by applying a predetermined electric field. Thus, the SNDM is an advantageous technique to attain the super high density dielectric recording/reproducing operation.

In order to attain the super high density dielectric recording/reproducing operation, SNDM is developed which is further small and suitable for the usage as the recording/reproducing apparatus. In this SNDM, a first electrode is formed on the rear surface of a dielectric record medium side, a second electrode serving as a probe is formed so as to be brought into contact with the small area of the dielectric substance (or brought into contact through small gap), and the plus or minus of a polarization of a small area recorded on a medium is read out by applying a low frequency alternating electric field for measurement between the first electrode and the second electrode from the first electrode. At this time, the second electrode is configured to be connected to a ground.

On the other hand, in order to attain the operation for recording/reproducing information at a high speed by using the SNDM, it is effective to use a plurality of probes and carry out the recording or reproducing by using them at the same time. However, in the conventional configuration, a plurality of resonators are required correspondingly to the number of the probes. As each resonator is relatively large in size, It is difficult to miniaturize the apparatus while integrating the plurality of large resonators. This is the factor that causes the miniaturization of the apparatus to be disturbed.

SUMMARY OF THE INVENTION

It is therefore an object of the present invention to provide: a recording apparatus for recording information in a small area of a dielectric substance by using SNDM which is small and uses a plurality of probes; a reproducing apparatus for reproducing recorded information by using SNDM which is small and uses a plurality of probes, and a recording/reproducing apparatus by using SNDM which is small and uses a plurality of probes.

The above object of the present invention can be achieved by a first dielectric information apparatus for recording information in a small area of a dielectric substance having a first surface and a second surface which are opposite to each other, provided with: a first electrode that is placed so as to be in contact with the first surface of the dielectric substance and whose tip portion is a predetermined curvature; a second electrode connected to the second surface of the dielectric substance; a record signal generating device for generating a record signal corresponding to the information to be recorded; and a signal applying device for applying the record signal to the first electrode.

According to the first dielectric information apparatus of the present invention, it becomes possible to record the information at high density in the small area of the dielectric substance. With respect to the dielectric substance used as a record medium, for example, its surface on the side of recording the information is formed flat, the first electrode for recording is preferably in contact with the surface, and it can be preferably moved. The second electrode closely contacts the other surface of the dielectric substance, and this surface is connected to, for example, an earth potential, which is a common potential.

The first electrode is an electric conductive material, for example, such as tungsten. The tip portion of the first electrode is a predetermined curvature and, for example, it is formed in the shape of a sphere of submicron order in radius. Alternatively, a cantilever for an AFM (Atomic Force Microscope) which is metal-coated or the like may be used as the first electrode.

The second electrode is, for example, an electric conductive substrate having a predetermined flat surface.

Moreover, the dielectric substance as a record medium can use a dielectric film on which the dielectric substance is formed in a predetermined method, for example, in a known method such as sputtering or the like, on the electric conductive substrate.

As the dielectric material, the following materials may be used.

(a) a PZT material as being a solid solution of $PbTiO_3$—$PbZrO_3$.
(b) lead titanate represented as $PbTiO_3$.
(c) lead zirconate represented as $PbZrO_3$.
(d) barium titanate represented as $BaTiO_3$.
(e) lithium niobate represented as $LiNbO_3$.
(f) a PLZT material as being a solid solution of lead (Pb), lantern (La), zirconium (Zr), and titanium (Ti).
(g) a BNPB material as being a solid solution of bismuth (Bi), sodium (Na), lead (Pb), and barium (Ba).

These materials may be used as the dielectric material in the form of ceramics, single crystal or a thin-film. Moreover, a piezoelectric polymer material, such as poly (vinylidene fluoride) (PDVF), copolymer of vinylidene fluoride and trifluoroethylene, copolymer of vinylidene fluoride and tetrafluoroethylene, copolymer of vinylidene cyanide and vinyl acetate, can be used as well. Furthermore, a combination with a plurality of the above materials can be also used.

The record signal generating device generates a record signal corresponding to information to be recorded in a small area of the dielectric material. The record signal is not limited to a digital one, but an analog one is available. It is constructed according to various data, such as audio information, image information, data for a computer, and the like.

The signal applying device applies the record signal generated by the record signal generating device to the first surface of the dielectric substance through the first electrode as a direct current voltage or a pulse. By the application of the record signal, the polarization state in the small area of the dielectric material is changed, and thus, the information is recorded in this area.

The above object of the present invention can be achieved by a second dielectric information apparatus for recording information in a small area of a dielectric substance having a first surface and a second surface which are opposite to each other, provided with: a first electrode that is placed so as to be in contact with the first surface of the dielectric substance and whose tip portion is a predetermined curvature; a second electrode connected to the second surface of the dielectric substance; a record signal generating device for generating a record signal corresponding to the information to be recorded; an alternation signal generating device for generating an alternation signal having a predetermined frequency; a signal superimposing device for superimposing the record signal and the alternation signal; a signal applying device for applying a signal superimposed by the signal superimposing device to the first electrode; an oscillating device for generating an oscillation signal on the basis of a capacitance formed between the first electrode and the second electrode of the dielectric substance and an inductance of an inductor; a demodulating device for demodulating the oscillation signal; and a signal reproducing device for reproducing the record signal using a signal demodulated by the demodulating device and the alternation signal.

According to the second dielectric information apparatus of the present invention, a record signal recorded in the dielectric substance is reproduced by the combination of the oscillating device, the demodulating device and the signal reproducing device. The reproduction of the record signal is performed at the same time as recording of the record signal. Therefore, it is possible to record the information while confirming whether or not the recording is properly performed.

The oscillating device is provided with a resonance circuit including a capacitance and an inductance. The capacitance is formed an area between the first electrode and the second electrode of the dielectric substance. The capacitance is varied with a state of the polarization of the dielectric substance. The inductance is formed by an inductor externally incorporated in the oscillating device. The oscillating device generates an oscillation signal with a frequency varied with the capacitance. Namely, the oscillation signal output from the oscillation device is modulated in frequency depending on the capacitance. The demodulating device demodulates the oscillation signal. The signal reproducing device reproduces the record signal by synchronizing a signal demodulated by the demodulating device with the alternation signal generated by the alternation signal generating device. The frequency of the oscillation signal is, for example, about 1 GHz on average.

The alternation signal generating device generates an alternation signal (e.g. an alternating voltage) with a relatively low frequency, for example, about 5 KHz. The alternation signal is superimposed on the record signal by the signal superimposing device. This synthesized signal is applied to the first electrode by the signal applying device.

The other structures and the explanation on the record medium are the same as those of the above described first dielectric information apparatus. As the first electrode, the same one used at the first dielectric information apparatus is available.

The above object of the present invention can be achieved by a third dielectric information apparatus for reproducing information recorded in a small area of a dielectric substance having a first surface and a second surface which are opposite to each other, provided with: a first electrode that is placed so as to be in contact with the first surface of the dielectric substance and whose tip portion is a predetermined curvature; a second electrode connected to the second surface of the dielectric substance; an alternation signal generating device for generating an alternation signal having a predetermined frequency; a signal applying device for applying the alternation signal to the first electrode; an oscillating device for generating an oscillation signal on the basis of a capacitance formed between the first electrode and the second electrode of the dielectric substance and an inductance of an inductor; a demodulating device for demodulating the oscillation signal; and a signal reproducing device for reproducing the information using a signal demodulated by the demodulating device and the alternation signal.

According to the third dielectric information apparatus of the present invention, it is an apparatus for reading information which is recorded in the dielectric substance as a capacitance depending on the polarization state between the first electrode and second electrode. An alternation signal of the predetermined frequency is generated by the alternation generating device, and it is applied to the first electrode. At this time, the first electrode is contact with the surface of the dielectric substance. The oscillating device generates an oscillation signal with a frequency varied with the capacitance formed by a small area between this contacting first electrode and the second electrode and by the inductance of the inductor. Namely, the oscillation signal output from the oscillation device is modulated in frequency depending on the capacitance. The demodulating device demodulates the oscillation signal. The signal reproducing device reproduces the information recorded in the dielectric substance by synchronizing a signal demodulated by the demodulating device with the alternation signal generated by the alternation signal generating device. Therefore, information which is recorded in the dielectric substance as a capacitance depending on the polarization state between the first electrode and second electrode can be read. The frequency of the alternation signal is about 5 KHz, for example. The frequency of the oscillation signal is about 1 GHz on average, for example. According to the third dielectric information apparatus, it becomes possible to reproduce high-quality information by synchronizing the alternation signal to read out the information.

The other structures and the explanation on the record medium are the same as those of the above described first dielectric information apparatus. As the first electrode, the same one used at the first dielectric information apparatus is available.

The above object of the present invention can be achieved by a fourth dielectric information apparatus for recording and reproducing information in an small area of a dielectric substance having a first surface and a second surface which are opposite to each other, provided with a recording device, a reproducing device and a selecting device. The recording device is provided with: a first electrode that is placed so as to be in contact with the first surface of the dielectric substance and whose tip portion is a predetermined curvature; a second electrode connected to the second surface of the dielectric substance; a record signal generating device for generating a record signal corresponding to the information to be recorded; an alternation signal generating device for generating an alternation signal having a predetermined frequency; a signal superimposing device for superimposing the record signal and the alternation signal; and a signal applying device for applying a signal superimposed by the signal superimposing device to the first electrode. The reproducing device is provided with: an oscillating device for generating an oscillation signal on the basis of a capacitance formed between the first electrode and the second electrode of the dielectric substance and an inductance of an inductor; a demodulating device for demodulating the oscillation signal; and a signal reproducing device for reproducing the record signal using a signal demodulated by the demodulating device and the alternation signal. The selecting device selects one of the recording device and the reproducing device.

According to the fourth dielectric information apparatus of the present invention, it is provided with the recording device and the reproducing device, as well as the selecting device for selecting which device to be operated. The respective structures of the recording device and the reproducing device and their operations are the same as those described above, but in the structure of the fourth dielectric information apparatus, the alternation signal generation device, the oscillating device, and the demodulating device of the recording device and the reproducing device are shared, and it is not necessary to equip devices exclusive for them. The selecting device, for example, switches the alternation signal for reproducing, which is applied to the first electrode, and the signal for recording, on which the record signal and the alternation signal are superimposed, by an external switching operation. The device for switching the signals is constructed by, for example, a mechanical relay device for switching one from two inputs, or a solid relay device provided with a semiconductor element. In the case that the signals are analog, the mechanical relay device is preferably used. In the case that the signals are digital, the solid relay device is preferably used.

The other structures and the explanation on the record medium are the same as those of the above described first dielectric information apparatus. As the first electrode, the same one used at the first dielectric information apparatus is available.

In one aspect of the second to fourth dielectric information apparatuses of the present invention, it is further provided with a cutoff device for cutting off the alternation signal with respect to the oscillating device.

Each of the second to fourth dielectric information apparatuses has the alternation signal generating device for generating an alternation signal to be applied to the first electrode and the oscillating device for generating an oscillation signal whose frequency is varied with a polarization state of the dielectric substance. If the alternation signal enters the oscillating device, the frequency of the oscillation signal is undesirably influenced by this.

This alternation signal is intended to give an oscillating electric field of a predetermined frequency to the polarization state and read out from a reproducing signal the recorded information at a high S/N ratio using this alternating current signal. However, if this alternation signal enters the oscillating device, it interferes with the oscillating device causing an oscillatory disturbance. Moreover, if a plurality of the first electrodes are placed in the dielectric information apparatus and a plurality of alternation signals with different frequencies are respectively applied to them, the undesirable interference occurs more. The cutoff device prevents such an undesirable interference.

The provision of the above described cutoff device enables one oscillating device to be shared even if the plurality of the first electrodes are placed. Namely, only one oscillating device, which requires a relatively large circuit structure, is necessary, so that it becomes possible to produce the recording device, the reproducing device, and the recording/reproducing device of small size at a cheap price.

In another aspect of the second to fourth dielectric information apparatuses of the present invention, the signal reproducing device reproduces the record signal by using a synchronous detection method.

According to this aspect, the oscillation frequency of the oscillating device, which changes on the basis of the capacitance of the dielectric substance in the small area, is demodulated by the demodulating device, and the demodulated signal is reproduced by using a phase relationship with the alternation signal. Since the signal synchronized with the alternation signal is extracted, it is possible to reproduce the record signal at a high S/N ratio. If the oscillation frequency is modulated with many alternation signals, it is synchronously separated with the respective alternation signals, and it becomes possible to reproduce accurate information corresponding to the respective alternation signals.

In another aspect of the second to fourth dielectric information apparatuses of the present invention, it is further provided with an earth electrode which is earthed and which is placed around the first electrode.

According to this aspect, the earth electrode forms such a circuit that the high-frequency electric field applied from the first electrode by the oscillating device passes through the capacitance in the small area on the surface of the medium and returns back to the side of the earth. Incidentally, if the electrode is placed around the first electrode and plays a role equal to the above described matter, its shape is no object.

In another aspect of the first to fourth dielectric information apparatuses of the present invention, the first electrode is provided with a plurality of electrodes placed at predetermined intervals.

According to this aspect, the provision of the plurality of the first electrodes enables the information to be recorded and reproduced at the same time at a plurality of positions on the surface of the medium. For example, in the case of being provided with eight the first electrodes, it becomes possible to write and read out the information by the eight bits, so that it is possible to improve the speeding up and the efficiency in data processing.

In another aspect of the second to fourth dielectric information apparatuses of the present invention, in the case that the first electrode is provided with a plurality of electrodes, the alternation signal generating device generates different alternation signals, each of which is supplied to the respective one of the plurality of the first electrodes.

According to this aspect, since each of the alternating current signals with different frequencies is applied to the respective one of the plurality of the first electrodes, when reproducing, it is possible to read out and reproduce the record signal from each first electrode by using the corresponding alternation signal as a reference signal, without mixing up with the signals read out from the other electrodes.

In another aspect of the first to fourth dielectric information apparatuses of the present invention, the dielectric substance is a ferroelectric substance.

According to this aspect, it becomes possible to write the information at a high density in the small area of the ferroelectric substance more excellently as compared with a typical dielectric substance.

The above object of the present invention can be achieved by a tape-like medium recording/reproducing apparatus for recording and reproducing information with respect to a tape-like dielectric record medium, provided with: a moving device for moving the dielectric record medium straight; a plurality of electrodes for contacting the dielectric record medium for recording and reading out the information; a common electrode which is earthed and which is disposed such that the dielectric record medium is sandwiched between the plurality of electrodes and this common electrode; and a signal processing device for generating a record signal to be recorded and reproducing the record signal read out from the dielectric record medium.

According to this aspect, it becomes possible to construct the high-density, high capacity recording/reproducing device using the tape-like dielectric record medium.

In one aspect of the tape-like medium recording/reproducing apparatus, the dielectric record medium is a ferroelectric substance.

According to this aspect, it becomes possible to write the information at a high density in the small area of the record medium composed of the ferroelectric substance more excellently as compared with the record medium composed of a typical dielectric substance.

The above object of the present invention can be achieved by a disc-like medium recording/reproducing apparatus for recording and reproducing information with respect to a disc-like dielectric record medium, provided with: a rotating device for rotating the dielectric record medium; a plurality of electrodes for contacting the dielectric record medium for recording and reading out the information; a common electrode which is earthed and which is disposed such that the dielectric record medium is sandwiched between the plurality of electrodes and this common electrode; a moving device for moving the plurality of electrodes in a radius direction of the dielectric record medium; and a signal processing device for generating a record signal to be recorded and reproducing a record signal read out from the dielectric record medium.

According to this aspect, it becomes possible to construct the high-density, high capacity, and high-speed accessible recording/reproducing device using the tape-like dielectric record medium.

In one aspect of the disc-like medium recording/reproducing apparatus, the dielectric record medium is a ferroelectric substance.

According to this aspect, it becomes possible to write the information at a high density in the small area of the record medium composed of the ferroelectric substance more excellently as compared with the record medium composed of a typical dielectric substance.

The nature, utility, and further features of this invention will be more clearly apparent from the following detailed description with reference to preferred embodiments of the invention when read in conjunction with the accompanying drawings briefly described below.

DETAILED DESCRIPTION OF THE PREFERRED EMBODIMENT

As for the preferred embodiments of the present invention, a dielectric information apparatus will be explained below by exemplifying the first to fourth embodiments, and the configuration examples of a tape-like medium recording/reproducing apparatus and a disc-like medium recording/reproducing apparatus will be described below with reference to the drawings, respectively.

First Embodiment

Figure 1:
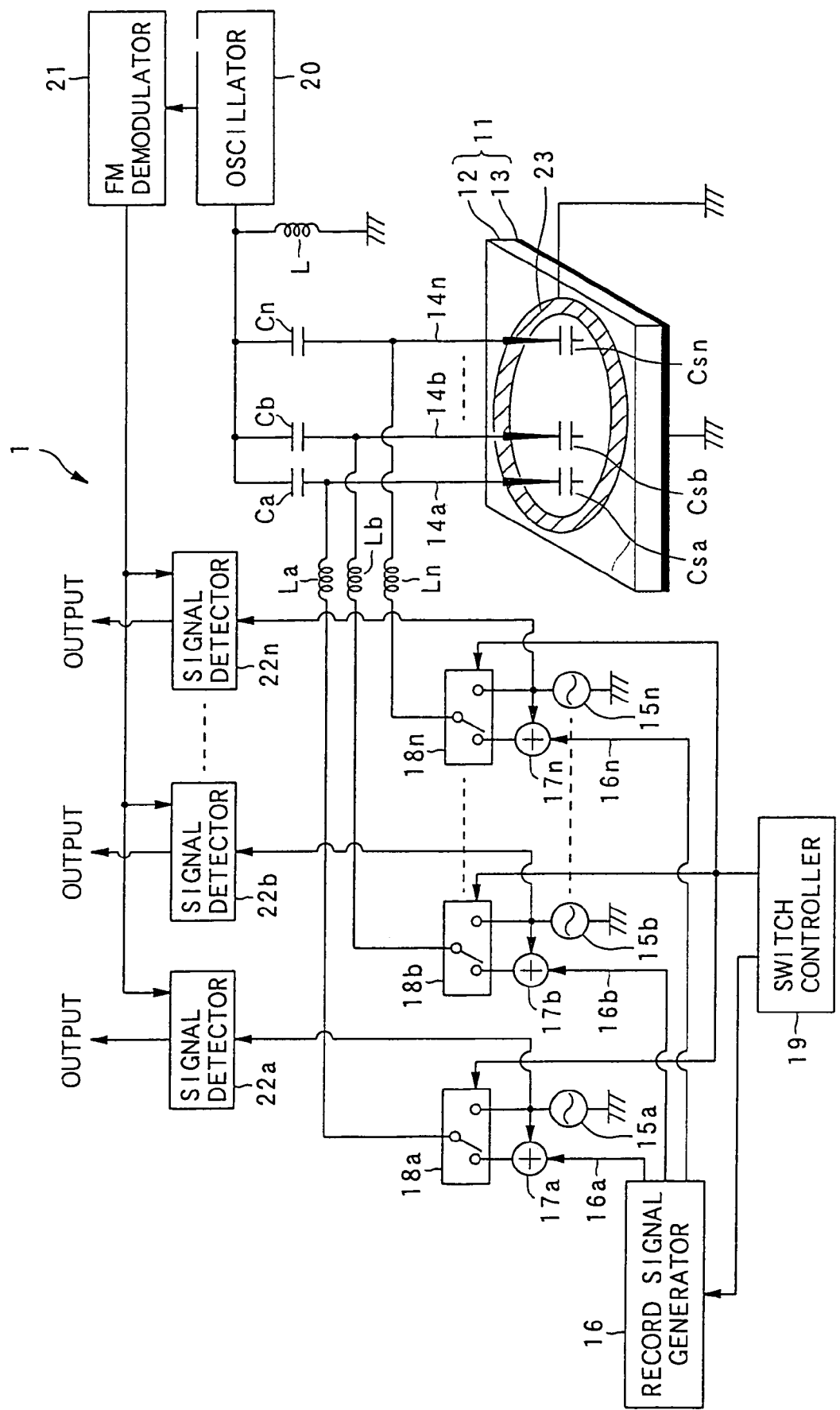
FIG. 1 is a view showing a configuration of a dielectric information apparatus in a first embodiment.
Figure 2:
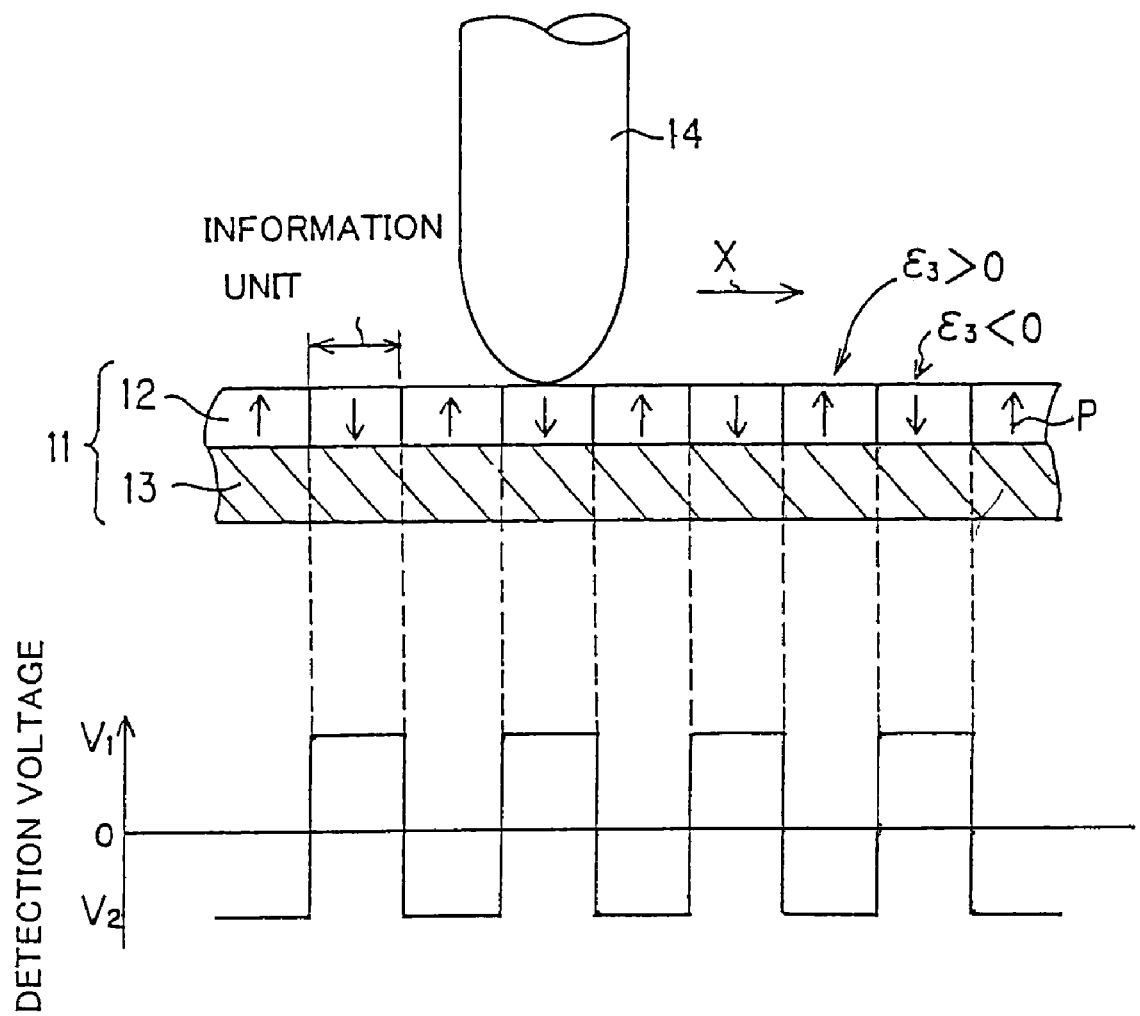
FIG. 2 is a view describing a relation between a polarization state of a dielectric substance and an output voltage.
Figure 3:
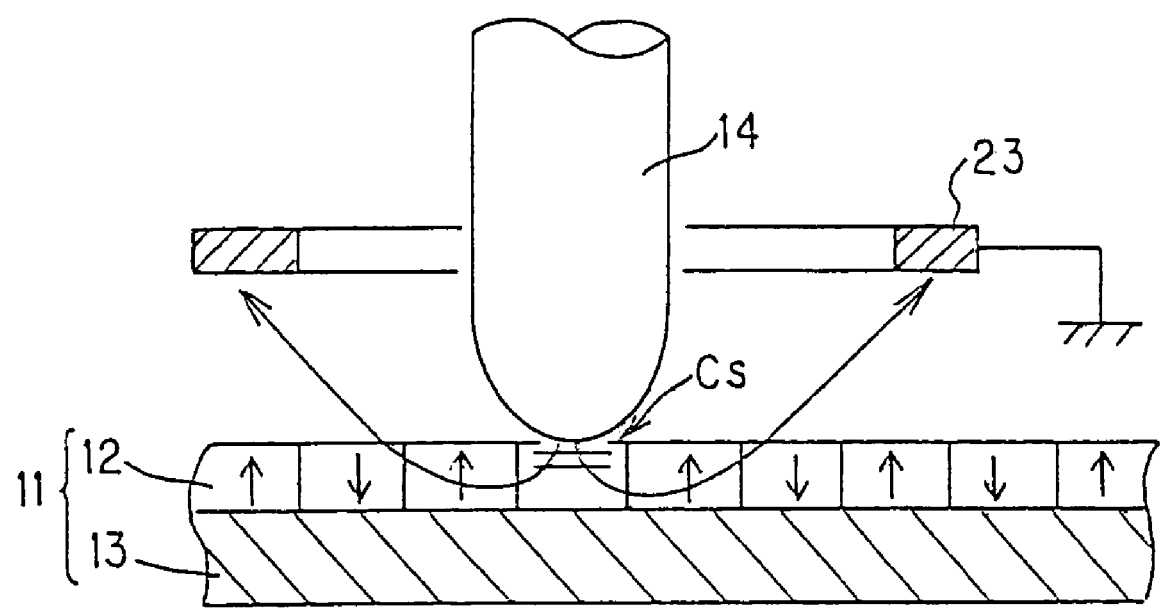
FIG. 3 is a view describing an action of an electrode placed around a probe.
Figure 4:
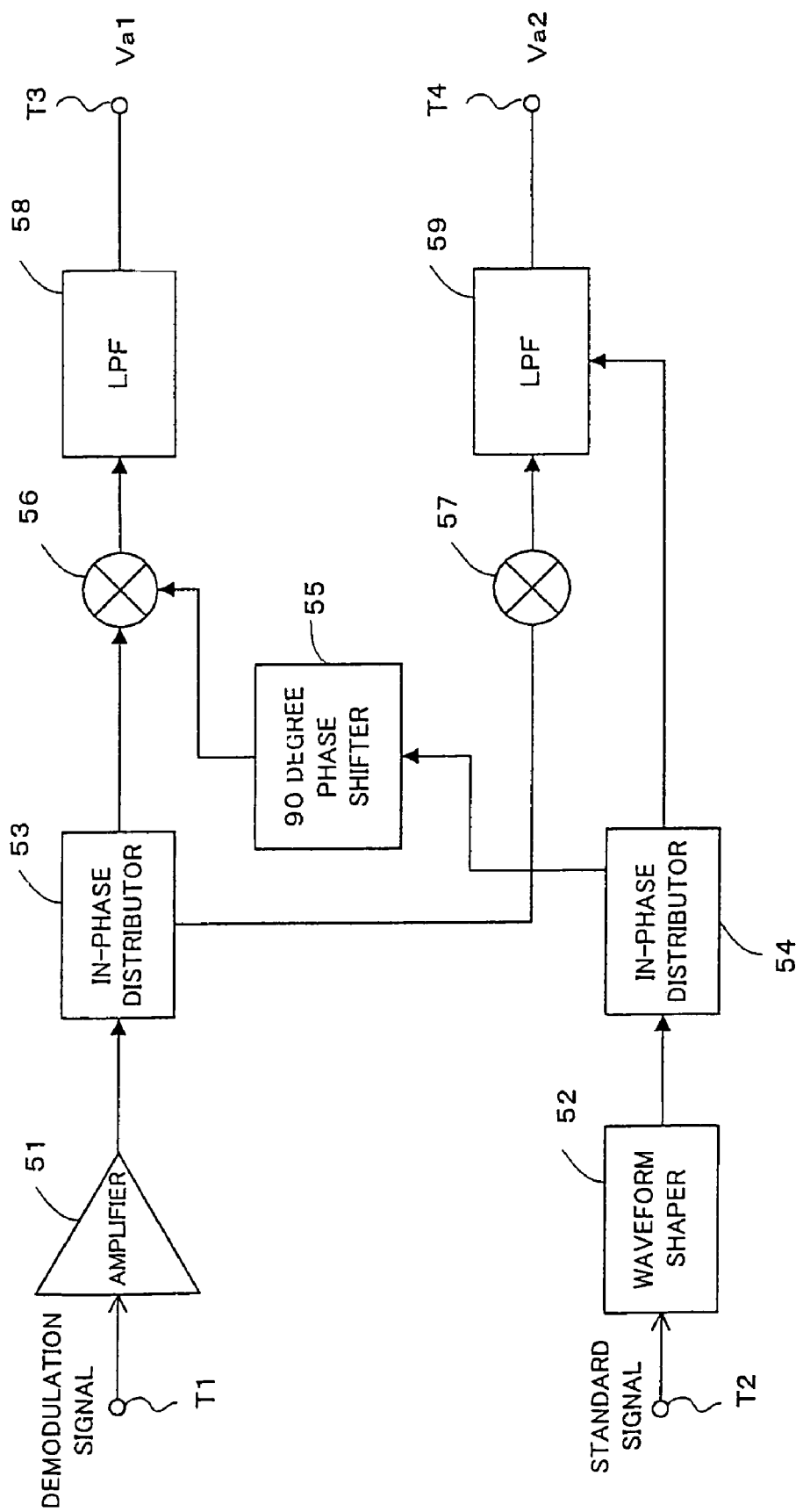
FIG. 4 is a view describing a configuration of a lock-in amplifier used for detecting a signal and an operation for detecting a signal.

At first, the dielectric information apparatus in the first embodiment is described with reference to FIGS. 1 to 4. FIG. 1 is a view showing the configuration of the first embodiment, FIG. 2 is a view describing a relation between a polarization state of a dielectric substance and an output voltage, FIG. 3 is a view describing an action of an electrode placed around a probe, and FIG. 4 is a view describing a configuration of a lock-in amplifier used for detecting a signal and a signal detecting operation of the lock-in amplifier.

This embodiment is the dielectric information apparatus having a recording/reproducing function which includes: a configuration of a recording system for using a dielectric substance formed on a conductor substrate as a record medium, and applying an electric field to a small area of the dielectric substance, thereby matching a direction of a polarization with a predetermined direction, and thereby making the small area function as an information recording unit, and thereby enabling to record information in the small area; and a configuration of a reproducing system for especially using a characteristic that a third dielectric constant $\epsilon_3$ is different depending on the direction of the polarization and the direction of the applied electric field (the dielectric constant $\epsilon_3$ is inverted between a case when the directions of the applied electric field and the polarization are equal to each other and a case when they are different), and detecting a change of a capacitance corresponding to the dielectric constant $\epsilon_3$, thereby reading out recorded information.

FIG. 1 is a schematic view showing the configuration of a dielectric information apparatus 1 in this embodiment. A dielectric record medium 11 for recording information is provided with a dielectric substance thin film 12 and an electrode 13 serving as a base of the dielectric substance thin film 12, and the electrode 13 is earthed. The dielectric substance thin film 12 is formed such that a dielectric substance material, such as $BaTiO_3$ and the like, is formed on the electrode 13 made of a conductive material by using a known technique such as a sputtering method and the like. Also, it may be such that a thin film electrode made of platinum and the like is formed on a Si substrate (not shown), and a dielectric substance thin film, such as PZT and the like, is formed thereon by using a method such as a sol-gel method and the like.

A plurality of probes 14a to 14n are placed so as to be brought into contact with the dielectric substance thin film 12 of the dielectric record medium 11. Capacitances Csa to Csn are formed in the small area of the dielectric substance thin film 12 sandwiched between the probes 14a to 14n and the electrode 13. Then, each of them functions as a record unit of the information.

The dielectric information apparatus 1 includes: alternating current signal generators 15a to 15n for generating alternating current signals applied to the probes 14a to 14n; a record signal generator 16 for generating record signals; adders 17a to 17n for superimposing signals 16a to 16n from the record signal generator 16 and the signals from the alternating current signal generators 15a to 15n on each other; switching devices 18a to 18n for each selecting the signal from each of the alternating current signal generators 15a to 15n and the signal from each of adders 17a to 17n; a switching controller 19 for controlling the record signal generator 16 and the switching devices 18a to 18n; inductors La to Ln for introducing the selected signals to the probes 14a to 14n; an inductor L for constituting a resonating circuit together with the capacitances Csa to Csn; an oscillator 20 that oscillates on the basis of values of the capacitances Csa to Csn and the inductor L; an FM demodulator 21 for demodulating a frequency-modulated oscillation signal from the oscillator 20; signal detectors 22a to 22n for reproducing the information by synchronizing the demodulation signal from the FM demodulator 21 with the signals from the alternating current signal generators 15a to 15n; and an electrode 23 that is earthed and that is placed so as to surround the probes 14a to 14n.

The alternating current signal generators 15a to 15n send peculiar alternation voltages whose frequencies are different from each other, through the inductors La to Ln to the probes 14a to 14n, respectively. A signal detected by each probe is discriminated by using the frequency of each alternation voltage. Namely, each alternation voltage functions as a reference signal when detecting the signal obtained from each probe. The frequencies of the alternation voltages are about 5 KHz on average. Then, the alternating current signal generator 15a to 15n apply the alternating electric fields to the small areas of the dielectric substance thin film 12 between the probes 14a to 14n and the electrode 13.

Thus, when the pure recording operation that does not involve the reproduction of the record information for checking whether or not the recording state is normally done while the recording is carried out is carried out, it is not necessary to apply the alternating electric fields for discriminating the signals to be detected by the respective probes 14a to 14n as mentioned above. Then, the applications of the alternating electric fields are done only for the signal reproductions. For this reason, at the time of the recording, as the record signals from the record signal generator 14n, respectively. On the other hand, at the time of the reproduction, for example, the alternating current signals that are sufficiently lower than a carrier frequency and are different in frequency correspondingly to the number of the probes 14a to 14n may be applied from the alternating current signal generators 15a to 15n, respectively. Then, whether or not the alternating electric fields are applied by the alternating current signal generators 15a to 15n as mentioned above may be switched by using the switches at the times of the recording and the reproducing.

FIG. 2 shows the condition when information is recorded on or reproduced from the dielectric record medium 11. At first, when the recording is done, the electric field based on the record information is applied to the dielectric substance film 12 between the probe 14 and the electrode 13. For example, when the electric field oriented towards the electrode 13 from the probe 14 is applied, the small area is assumed to be a downward polarization P, and when the electric field oriented towards the probe 14 from the electrode 13 is applied, it is assumed to be an upward polarization P. The directions of the polarization P set by the application of the alternating electric field corresponds to the recorded information. When the probe 14 is operated to move in a direction indicated by an arrow X, a detection voltage is outputted as a rectangular wave that is swung upwardly and downwardly, in response to the polarization P. As this level is changed in accordance with a polarization degree of the polarization P, information can be recorded as an analog signal.

Next, at the reproducing operation, a plus or minus of the third dielectric constant $\epsilon_3$ is inverted on the basis of a relationship between the direction of the alternating electric field applied from each probe 14 and the direction of the corresponding polarization P. According to the inversion of the dielectric constant $\epsilon_3$, the value of each capacitance Csa to Csn is changed. Then, the oscillation frequency of the oscillator 20 is changed on the basis of the value of each capacitance Csa to Csn. The recorded information can be read out by demodulating the oscillation frequency.

The record signal generator 16 generates the record signals, which are superimposed on the alternating current signals of the alternating current signal generators 15a to 15n, and sent to the probes 14a to 14n at the time of the recording. These signals are not limited to digital signals, and they may be analog signals. These signals contain various signals, such as music information, picture information, and digital data for a computer and the like. Also, the alternating current signals superimposed on the record signals are used for the reproduction. More concretely, they are used as reference signals for discriminating the information from the signals obtained from respective probes at a time of a signal reproduction.

The adders 17a to 17n are used to superimpose the peculiar different alternating current signals from the alternating current signal generators 15a to 15n on the record signals 16a to 16n. By the adders 17a to 17n, the record signals become the signal containing an alternating current component, and are supplied to the probes 14a to 14n through the inductors La to Ln, respectively.

The switching devices 18a to 18n select the signals from the alternating current signal generators 15a to 15n at the time of the reproducing so that they are sent to the probes 14a to 14n. On the other hand, they select the signals from the record signal generator 16 at the time of the recording so that they are sent to the probes 14a to 14n. As the switching devices 18a to 18n, a mechanical relay or a semiconductor circuit may be used. However, preferably, in the case that an analog signal is used, the mechanical relay may be used. In the case that a digital signal is used, the semiconductor circuit may be used.

The switching controller 19 is actuated by an operational indication of a user. When the recording operation is carried out, it starts the operation of the record signal generator 16, and connects the switching devices 18a to 18n to the side of the record signal generator 16. On the other hand, when the reproducing operation is carried out, it connects the switching devices 18a to 18n to the sides of the alternating current signal generators 15a to 15n, respectively. Also, it reports the selected operation to various control circuits, driving circuits, control circuits having CPUs as main devices for controlling them and the like (which are not shown) of the dielectric information apparatus, and it indicates them to control and drive the apparatus.

The inductors La to Ln and the capacitances Ca to Cn are used to constitute a high-pass filter for cutting off a signal system so that the signals from the alternating current signal generators 15a to 15n and the record signal generator 16 do not interfere with the oscillation of the oscillator 20. Then, the cut-off frequency is $f=1/2\pi\sqrt{\{L(a \text{ to } n)C(a \text{ to } n)\}}$. Here, let us suppose that L is an inductance of the inductor L(a to n), and C is a capacitance of the capacitance C(a to n). The frequency of the alternating current signals are about 5 KHz on average, and the oscillation frequency of the oscillator 20 is about 1 GHz on average. Thus, the separation can be sufficiently done through a first LC filter. Moreover, although a filter having a higher degree may be used, the number of the elements is greater. Hence, there may be a fear that the apparatus becomes larger.

Also, the frequency of each alternating current signal of the alternating current signal generator 15 and the oscillation frequency of the oscillator 20 are desired to be made higher in order to improve the reading speed. In this case, the constant of the filter needs to be selected correspondingly to it.

The oscillator 20 oscillates at a resonation frequency of $f0=1/2\pi\sqrt{(LC)}$ of a resonating circuit composed of the inductor L and the capacitances Csa to Csn. Here, L is assumed to be an inductance of the inductor L, and C is assumed to be the synthesized capacitance of the capacitances Csa to Csn and the floating capacitance (not shown) around the probes 14, which are positioned in parallel to each other. The oscillator 20 is separated from the side of a signal source by the inductors La to Ln and the capacitances Ca to Cn, as mentioned above. Thus, it is not necessary to install the oscillators for the respective probes. It is enough to install one oscillator. The inductance of the inductor L is set such that the frequency has a value centering at about 1 GHz.

Here, as for the influence on the oscillation of the capacitances Ca to Cn and the floating capacitance, at first, with regard to the capacitances Ca to Cn, their capacitances are much greater than those of the capacitances Csa to Csn, and they are connected in series. Thus, the capacitances Csa to Csn are dominant over the oscillation frequency. Also, the floating capacitance is parallel to the capacitances Csa to Csn. However, the relation between this floating capacitance and the oscillation frequency can be known by using a predetermined method, for example, a sample whose dielectric constant is already known. Hence, the change in the oscillation frequency can be separated from the floating capacitance with respect to the changes of the respective capacitances Csa to Csn.

The FM demodulator 21 performs the FM detection on the output from the oscillator 20 oscillating correspondingly to the change of the capacitances Csa to Csn, and demodulates into an amplitude signal. This demodulated signal includes the component of the alternating current signal applied to each probe in addition to the recorded information.

Each of the signal detectors 22a to 22n separates each alternating current signal, namely, the alternating current signal corresponding to each probe from the demodulation signal obtained from the FM demodulator 21, by using the alternating current signal from each of the alternating current signal generators 15a to 15n as the reference signal, and reproduces the recorded information. For example, a lock-in amplifier is used as the signal detector 22. The establishment of the synchronization with each frequency enables only the component of that frequency to be separated at a high S/N ratio and taken out. Incidentally, another phase detecting method may be adapted.

The electrode 23 is the earthed electrode that is placed around the probes 14a to 14n, as shown in FIG. 3, and it is the electrode for constituting a circuit in which a high frequency electric field oscillated by the oscillator 20 is sent from a tip of the probe 14, passed through a micro capacitance Cs of the small area of the dielectric substance, and returned back to the earthed side. The electrode having any shape may be used if it carries out the above-mentioned operation.

The recording operation of the dielectric information apparatus 1 in this embodiment will be described below.

At first, the switching controller 19 is actuated to indicate the recording operation. The record signal generator 16 generates record signals to be recorded, and the record signals are superimposed on the alternating current signals from the alternating current signal generators 15 by the adders 17, and inputted to the switching devices 18. The switching devices 18 are controlled by the switching controller 19, and the record signals are applied to the probes 14a to 14n through the inductors La to Ln. The application causes an electric field to be induced between the probe 14 and the electrode 13 of the dielectric record medium 11, and a polarization corresponding to a direction of the electric field is generated in the small area of the dielectric substance film 12 sandwiched between both of the electrodes. This polarization corresponds to the record of the information.

As the same time as the above described recording operation, the reproduction operation is performed in order to check whether or not the recording operation is correctly done. The following explanation is about the reproduction for the recording monitor. When the recording is done as mentioned above, the capacitance of the capacitance Cs is determined on the basis of the polarization state. The oscillator 20 oscillates at the resonation frequency of the resonating circuit including the capacitance Cs and the inductor L as the member. The signal modulated correspondingly to the change in the capacitance Cs outputted from the oscillator 20 is demodulated by the FM demodulator 21 and converted into an AM signal. This AM signal is inputted to the signal detectors 22, and the alternating current signals superimposed on the record signals are also inputted. Then, the synchronous detection is carried out in each signal detector 22. Consequently, the information written by the respective probes 14a to 14n are instantly reproduced and outputted, respectively.

Next, the reproduction operation of the dielectric information apparatus 1 in this embodiment will be described below.

At first, the switching controller 19 is actuated to indicate the reproduction operation. The alternating current signals from the alternating current signal generators 15 are inputted to the switching devices 18. The switching devices 18 are controlled by the switching controller 19, and the alternating current signals are applied to the probes 14a to 14n through inductors La to Ln The application causes an electric field to be induced between the probes 14 and the electrode 13 of the dielectric record medium 11, and a capacitance of the capacitance Cs is determined from a direction of the electric field and a direction of a polarization in the small area of the dielectric substance 12 sandwiched between both of the electrodes. The oscillator 20 oscillates at the resonation frequency of the resonating circuit including this capacitance Cs and the inductor L as the member. The signal modulated correspondingly to the change in the capacitance Cs outputted from the oscillator 20 is demodulated by the FM demodulator 21 and converted into an AM signal. This AM signal is inputted to the signal detectors 22, and the alternating current signals superimposed on the record signals are also inputted. Then, the synchronous detection is carried out in each signal detector 22. Consequently, the record information is extracted from the signals obtained from the respective probes 14a to 14n, and reproduced.

The lock-in amplifier used for the synchronous detection in the signal detector will be described below with reference to FIG. 4. Incidentally, the device used for the synchronous detection is not limited to this lock-in amplifier, as mentioned above.

As shown in FIG. 4, a lock-in amplifier 5 is provided with input terminals T1, T2, an amplifier 51, a waveform shaper 52, in-phase distributors 53, 54, a 90 degree phase shifter 55, mixers 56, 57 serving as multipliers, low-pass filters 58, 59 and output terminals T3, T4.

The amplifier 51 amplifies a demodulation signal inputted through the input terminal T1 and outputs it to the in-phase distributor 53. The in-phase distributor 53 distributes the amplified demodulation signal at the in-phase and outputs it to the mixers 56, 57. On the other hand, the waveform shaper 52 converts the shape of a reference signal (i.e. the alternating current signal of FIG. 1) inputted through the input terminal T2 into a rectangular wave, and outputs it to the in-phase distributor 54. The in-phase distributor 54 distributes the reference signal outputted from the waveform shaper 52 at the in-phase, and outputs it to the mixer 57 and the 90 degree phase shifter 55. The 90 degree phase shifter 55 shifts the reference signal by 90 degree at the frequency of the reference signal, and outputs it to the mixer 56. The mixer 56 multiplies and mixes the demodulation signal and the reference signal shifted by 90 degree, and converts into a signal having frequencies of a sum and a difference between the frequency of the demodulation signal and the frequency of the reference signal, and outputs it to the low-pass filter 58. The low-pass filter 58 passes only a direct current signal among the input signals after the mixing, and outputs an output voltage Va1 to the output terminal T3. The mixer 57 multiplies and mixes the demodulation signal and the reference signal, and converts into the signal having the frequencies of the sum and the difference between the frequency of the demodulation signal and the frequency of the reference signal, and outputs it to the low-pass filter 59.

The low-pass filter 59 passes only the direct current signal among the input signals after the mixing, and outputs an output voltage Va2 to the output terminal T4.

Assuming that a phase difference between the demodulation signal inputted to the input terminal T1 and the reference signal inputted to the input terminal T2 is $\phi$, and that an absolute value of a voltage after the low-pass filtering when the demodulation signal and the reference signal (rectangle wave) are multiplied at the in-phase (i.e. $\phi=0$) is |Va|, the voltage Va1 is represented by the equation (1) because the reference signal is shifted by 90 degree and mixed with the demodulation signal. Similarly, the voltage Va2 outputted from the low-pass filter 59 is represented by the equation (2).

$$Va1=|Va|\sin \phi \qquad (1)$$

$$Va2=|Va|\cos \phi \qquad (2)$$

The relation between the oscillation frequency, the dielectric constant and the alternating current electric field applied to the small area of the dielectric substance will be described below with regard to the dielectric information apparatus 1 having the basic circuit designed as mentioned above.

In the dielectric information apparatus 1, when the alternating current voltage Vp which is a sine wave with a frequency fp is applied to the small area between the probes 14 and the electrode 13 by the alternating current signal generators 15, the alternating current electric field Ep, which is proportional to an amplitude of the alternating current voltage Vp, namely, which has a sine wave with the frequency fp, is induced in the small area. The alternating current voltage Vp and the alternating current electric field Ep can be represented by the equation (4) and the equation (5) by using an angular frequency $\omega p$ represented by the equation (3). Here, $Vp_0$ is an amplitude of the alternating current voltage Vp, and $Ep_0$ is an amplitude of the alternating current electric field Ep.

$$\omega p = 2\pi fp \qquad (3)$$

$$Vp = Vp_0 \cos \omega p \qquad (4)$$

$$Ep = Ep_0 \cos \omega p \qquad (5)$$

Also, a dielectric constant $\epsilon t$ of the small area when the alternating current voltage Vp is applied is represented by the equation (6) by using the alternating current electric field Ep, a second dielectric constant $\epsilon_2$, a third dielectric constant $\epsilon_3$ and a fourth dielectric constant $\epsilon_4$, as well known.

$$\epsilon t = \epsilon_2 + \epsilon_3 Ep + (1/2)\epsilon_4 Ep^2 \qquad (6)$$

Here, the equation (6) can be introduced as follows. When an electric field is applied to a dielectric substance, an electrical flux density and an electric field are assumed to be D and E, respectively, an electrical entropy and an inner energy accumulated in a unit volume of the dielectric substance are assumed to be H and U, respectively, and the differentiations of the electrical flux density D, the electric field E, the inner energy U and the electrical entropy H are dD, dE, dU and dH, respectively. Then, the equation (7) and the equation (8) are established as follows.

$$dU = EdD \qquad (7)$$

$$H = U - ED \qquad (8)$$

From the above-mentioned equations (7), (8), the differentiation dH is represented by the equation (9). Thus, the electrical flux density D is represented by the equation (10).

$$dH = -DdE \quad (9)$$

$$D = -\partial H/\partial E \quad (10)$$

Next, when the Taylor expansion is carried out up to a fourth item at an origin by using the electrical entropy H as a function of the electric field E, the electrical entropy H is given by the equation (11).

$$H = (1/2)(\partial^2 H/\partial E^2)_0 E^2 + (1/6)(\partial^3 H/\partial E^3)_0 E^3 + (1/24)(\partial^4 H/\partial E^4)_0 E^4 \quad (11)$$

Here, the zeroth item is 0 since an energy accumulated in the field at the electric field E=0 is assumed to be 0. Also, the first item is 0 from the fact that the electrical flux density is D=0 at the electric field E=0 and from the equation 10. Also, from the equations (10), (11), the electric flux density D is represented by the equation (12).

$$D = -(\partial^2 H/\partial E^2)_0 E - (1/2)(\partial^3 H/\partial E^3)_0 E^2 - (1/6)(\partial^4 H/\partial E^4)_0 E^3$$

$$= \varepsilon_2 E + (1/2)\varepsilon_3 E^2 + (1/6)\varepsilon_4 E^3 \quad (12)$$

Here, $$-(\partial^2 H/\partial E^2)_0 = \epsilon_2 \quad (13)$$

$$-(\partial^3 H/\partial E^3)_0 = \epsilon_3 \quad (14)$$

$$-(\partial^4 H/\partial E^4)_0 = \epsilon_4 \quad (15)$$

In view of the above-mentioned explanation, when the Taylor expansion is performed on the electric entropy H, $\epsilon_2$ corresponding to the second expansion coefficient is referred to as the second dielectric constant, $\epsilon_3$ corresponding to the third expansion coefficient is referred to as the third dielectric constant, and $\epsilon_4$ corresponding to the fourth expansion coefficient is referred to as the fourth dielectric constant. Moreover, in the equation (12), let us consider the case that a micro electric field $\Delta E$ corresponding to an oscillation signal is superimposed on the alternating current electric field Ep. At this time, when an electric flux density corresponding to the alternating current electric field Ep is assumed to be Dp and a micro electric flux density corresponding to the micro electric field $\Delta E$ is assumed to be $\Delta D$, the equation (12) can be represented as the equation (16).

$$Dp + \Delta D = \epsilon_2(Ep + \Delta E) + (1/2)\epsilon_3(Ep + \Delta E)^2 + (1/6)\epsilon_4(Ep + \Delta E)^3 \quad (16)$$

Here, the electric flux density Dp is represented by the equation (17), and the micro electric field $\Delta E$ is much smaller than the alternating current electric field Ep. Thus, the item containing $(\Delta E)^2$ and $(\Delta E)^3$ can be made approximate to 0. Hence, $\Delta D$ of the second item of the equation (17) can be represented by the equation (18).

$$Dp = \epsilon_2 Ep + (1/2)\epsilon_3 Ep^2 + (1/6)\epsilon_4 Ep^3 \quad (17)$$

$$\Delta D = \varepsilon_2 \Delta E + \varepsilon_3 Ep \Delta E + (1/2)\varepsilon_4 Ep^2 \Delta E$$

$$= \{\varepsilon_2 + \varepsilon_3 Ep + (1/2)\varepsilon_4 Ep^2\}\Delta E$$

$$= \varepsilon t \Delta E \quad (18)$$

As can be evident from the equation (18), the equation (6) can be introduced as a proportional coefficient $\epsilon t$ between the micro electric flux density $\Delta D$ induced by the micro electric field $\Delta E$ and the micro electric field $\Delta E$. The plus or minus of the third dielectric constant $\epsilon_3$ is inverted between the case when the direction of the alternating current electric field Ep is equal to the direction of the polarization P and the case when the direction of the alternating current electric field Ep is opposite to the direction of the polarization P. Also, in the equation (6), the dielectric constants of the degree higher than the fourth dielectric constant $\epsilon_4$ are ignored, the dielectric constants of the higher degree are much smaller than the second, third and fourth dielectric constants. Thus, in the following explanation, there is no influence of the ignorance of the dielectric constants of the higher degree. Also, in the following explanation, the equations are limited to the first dimension in the thickness direction of the dielectric substance, and they are provided.

The capacitance Cs constituted by the small area sandwiched between the probe 14 and the electrode 13 is proportional to the dielectric constant $\epsilon t$. Thus, it can be represented by the equation (19) by using the equation (6), a plus constant Ce determined by the dielectric substance, an area of a tip of the probe 14, and a thickness d of the dielectric substance.

$$Cs = Ce(1/d)\{\epsilon_2 + \epsilon_3 Ep + (1/2)\epsilon_4 Ep^2\} \quad (19)$$

Also, the capacitance Cs represented by the equation (19) can be represented by the equation (22) by using a capacitance $C_0$ represented by the equation (20) and a capacitance change amount $\Delta C$ represented by the equation (21). Here, the capacitance $C_0$ is the capacitance constituted by the electrode 13 and the probe 14 when the alternating current voltage Vp is not applied, and the small area sandwiched between the electrode 13 and the probe 14. The capacitance change amount $\Delta C$ is the capacitance change amount from the capacitance $C_0$ when the alternating current voltage Vp is applied.

$$C_0 = Ce(1/d)\epsilon_2 \quad (20)$$

$$\Delta C = Ce(1/d)\{\epsilon_3 Ep + (1/2)\epsilon_4 Ep^2\} \quad (21)$$

$$Cs = C_0 + \Delta C \quad (22)$$

By substituting the alternating current electric field Ep represented by the equation (5) for the right side of the equation (21) and further changing by using the formula of a trigonometric function, $\Delta C$ can be represented by the equation (24).

$$\cos^2(\omega p \cdot t) = \{1 + \cos(2\omega p \cdot t)\}/2 \quad (23)$$

$$\Delta C = Ce(1/d)\{\epsilon_4 Ep_0^2/4 + \epsilon_3 Ep_0 \cos(\omega p \cdot t) + (\epsilon_4 Ep_0^2/4)\cos(2\omega p \cdot t)\} \quad (24)$$

Moreover, the equation (24) can be converted into the equation (28) by using the capacitance change amounts $\Delta C_2$, $\Delta C_3$ and $\Delta C_4$ represented in the equations (25), (26) and (27). Here, the capacitance change amount $\Delta C_2$ is the change amount which is proportional to the fourth dielectric constant $\epsilon_4$ and the square of the amplitude $Ep_0$ of the alternating current electric field Ep and is not temporally changed. The capacitance change amount $\Delta C_3$ is the capacitance change amount which has the amplitude proportional to the third dielectric constant $\epsilon_3$ and the amplitude $Ep_0$ of the alternating current electric field Ep and has an angular frequency $\omega p$ and is alternately changed. And, the capacitance change amount $\Delta C_4$ is the capacitance change amount which has the amplitude proportional to the fourth dielectric constant $\epsilon_4$ and the square of the amplitude $Ep_0$ of the alternating current electric field Ep and has an angular frequency $2\omega p$ and is alternately changed.

$$\Delta C_2 = Ce(1/d)(\epsilon_4 Ep_0^2/4) \quad (25)$$

$$\Delta C_3 = Ce(1/d)\epsilon_3 Ep_0 \cos(\omega p \cdot t) \quad (26)$$

$$\Delta C_4 = Ce(1/d)(\epsilon_4 Ep_0^2/4)\cos(2\omega p \cdot t) \quad (27)$$

$$\Delta C = \Delta C_2 + \Delta C_3 + \Delta C_4 \quad (28)$$

On the other hand, the capacitance Cs and the inductor L constitute the LC resonating circuit, as mentioned above. As well known, a resonation frequency $f_{LC}$ of the LC resonating circuit is represented by the equation (29).

$$f_{LC} = 1/\{2\pi\sqrt{(L \cdot Cs)}\} \quad (29)$$
$$= 1/[2\pi\sqrt{\{L \cdot (C_0 + \Delta C)\}}]$$

Also, $\epsilon_3 Ep_0$ in the equation (26) and $\epsilon_4 Ep_0^2/4$ in the equation (27) are much smaller than the second dielectric constant $\epsilon_2$. Thus, from the equations (20), (21), $C_0 \gg \Delta C$ is established. Hence, when the equation (29) is converted by using the approximation expression represented by the equation (30), the relation between the capacitance change amount $\Delta C$ and the resonance frequency change amount $\Delta f_{LC}$ can be represented by the equation (31).

$$\sqrt{(1+\Delta C/C0)} = (1+\Delta C/C0)^{-1/2} \approx 1 - (1/2)(\Delta C/C0) \quad (30)$$

$$\Delta C/C0 = -2\Delta f_{LC}/f_{LC} \quad (31)$$

As mentioned above, the resonance frequency $f_{LC}$ of the LC resonating circuit is changed by the resonance frequency change amount $\Delta f_{LC}$ proportionally to the capacitance change amount $\Delta C$ of the capacitance Cs. Thus, the oscillator 20 oscillates and generates the oscillation signal having the oscillation frequency $f_{OSC}$ that is the same frequency as the resonance frequency $f_{LC}$, and outputs to the FM demodulator 21. Here, as mentioned above, the resonance frequency $f_{LC}$ of the LC resonating circuit is changed by the resonance frequency change amount $\Delta f_{LC}$, proportionally to the capacitance change amount $\Delta C$ of the capacitance Cs. Hence, similarly, the oscillation frequency $f_{OSC}$ is changed proportionally to the capacitance change amount $\Delta C$ of the capacitance Cs.

Also, as mentioned above, the capacitance change amount $\Delta C$ contains: the capacitance change amount $\Delta C_3$, which has the amplitude proportional to the third dielectric constant $\epsilon_3$ and the amplitude $Ep_0$ of the alternating current electric field Ep and has the angular frequency $\omega p$ and is alternately changed; and the capacitance change amount $\Delta C_4$, which has the amplitude proportional to the fourth dielectric constant $\epsilon_4$ and the square of the amplitude $Ep_0$ of the alternating current electric field Ep and has the angular frequency $2\omega p$ and is alternately changed. Thus, the oscillation signal is the oscillation signal that is frequency-modulated in accordance with: a signal S3 which has the amplitude proportional to the third dielectric constant $\epsilon_3$ and the amplitude $Ep_0$ of the alternating current electric field Ep and has the angular frequency $\omega p$, namely, a frequency fp; and a signal S4 which has the amplitude proportional to the fourth dielectric constant $\epsilon_4$ and the square of the amplitude $Ep_0$ of the alternating current electric field Ep and has the angular frequency $2\omega p$, namely, a frequency 2fp. At this time, the frequency shift of the frequency-modulated oscillation signal is proportional to the amplitude of the signal S3 and the amplitude of the signal S4.

The FM demodulator 21 performs the FM demodulation process on the oscillation signal, and outputs the demodulation signal, which contains: the signal S3 having the amplitude proportional to the third dielectric constant $\epsilon_3$ and the amplitude $Ep_0$ of the alternating current electric field Ep and having the frequency fp,; and the signal S4 having the amplitude proportional to the fourth dielectric constant $\epsilon_4$ and the square of the amplitude $Ep_0$ of the alternating current electric field Ep and having the frequency 2fp, to the terminal T1 of the lock-in amplifier 5.

In the lock-in amplifier 5, the mixer 56 multiplies and mixes one demodulation signal distributed as the in-phase after the amplification and the reference signal in which the wave form is converted and the phase is shifted by 90 degree, and converts into the signal having the frequencies of the sum and the difference between the frequency of the demodulation signal and the frequency of the reference signal, and then outputs it to the low-pass filter 58. The low-pass filter 58 outputs only an output voltage $|Va|\sin\phi$ 16, direct current voltages or pulses may be applied to the probes 14a to that is a direct current component of the signal after the mixing to the terminal T3. On the other hand, the mixer 57 multiplies and mixes the other demodulation signal distributed as the in-phase and the reference signal whose wave form is converted, and converts into the signal having the frequencies of the sum and the difference between the frequency of the demodulation signal and the frequency of the reference signal, and then outputs it to the low-pass filter 59. The low-pass filter 59 outputs only an output voltage $|Va|\cos\phi$ that is a direct current component of the signal after the mixing to the terminal T4.

Here, the signal S3 is the signal having the frequency fp of the reference signal. Thus, the mixer 58 and the mixer 57 output the output voltage $|Va|\sin\theta$ and the output voltage $|Va|\cos\theta$ which are the direct current signals generated when the reference signal and the signal S3 having the frequency fp are multiplied and mixed, respectively. That is, the output voltage Va1 and the output voltage Va2 are the voltages corresponding to the phase difference $\phi$ and the third dielectric constant $\epsilon_3$. In particular, if the third dielectric constant $\epsilon_3$ is the real number and the plus value, the capacitance change amount $\Delta C_3$ and the alternating current electric field Ep are changed in the in-phase, as evident from the equation (26). Also, the capacitance change amount $\Delta C_3$ and the resonance frequency change amount $\Delta f_{LC}$ are changed in the opposite phase, as evident from the equation (31).

From the above-mentioned explanations, when the third dielectric constant $\epsilon_3$ is the real number and the plus value, the resonance frequency change amount $\Delta f_{LC}$ is changed in the phase opposite to that of the electric field electric field Ep. Moreover, the alternating current electric field Ep and the alternating current voltage Vp are changed in the in-phase. Thus, when the third dielectric constant $\epsilon_3$ is the real number and the plus value, the phase difference between the reference signal and the signal S3 is $\pi$. Similarly, when the third dielectric constant $\epsilon_3$ is the real number and the minus value, the phase difference between the reference signal and the signal S3 is 0.

As mentioned above, when the third dielectric constant $\epsilon_3$ is the real number, the phase difference between the reference signal and the signal 3 is 0 or $\pi$, and the output voltage Va1 is 0, and only the output voltage Va2 is outputted. Also, when the third dielectric constant $\epsilon_3$ is plus, the phase difference is $\pi$, and the output voltage Va2 is outputted as the minus value. On the other hand, when the third dielectric constant $\epsilon_3$ is minus, the phase difference is 0, and the output voltage Va2 is outputted as the plus value.

Second Embodiment

Figure 5:
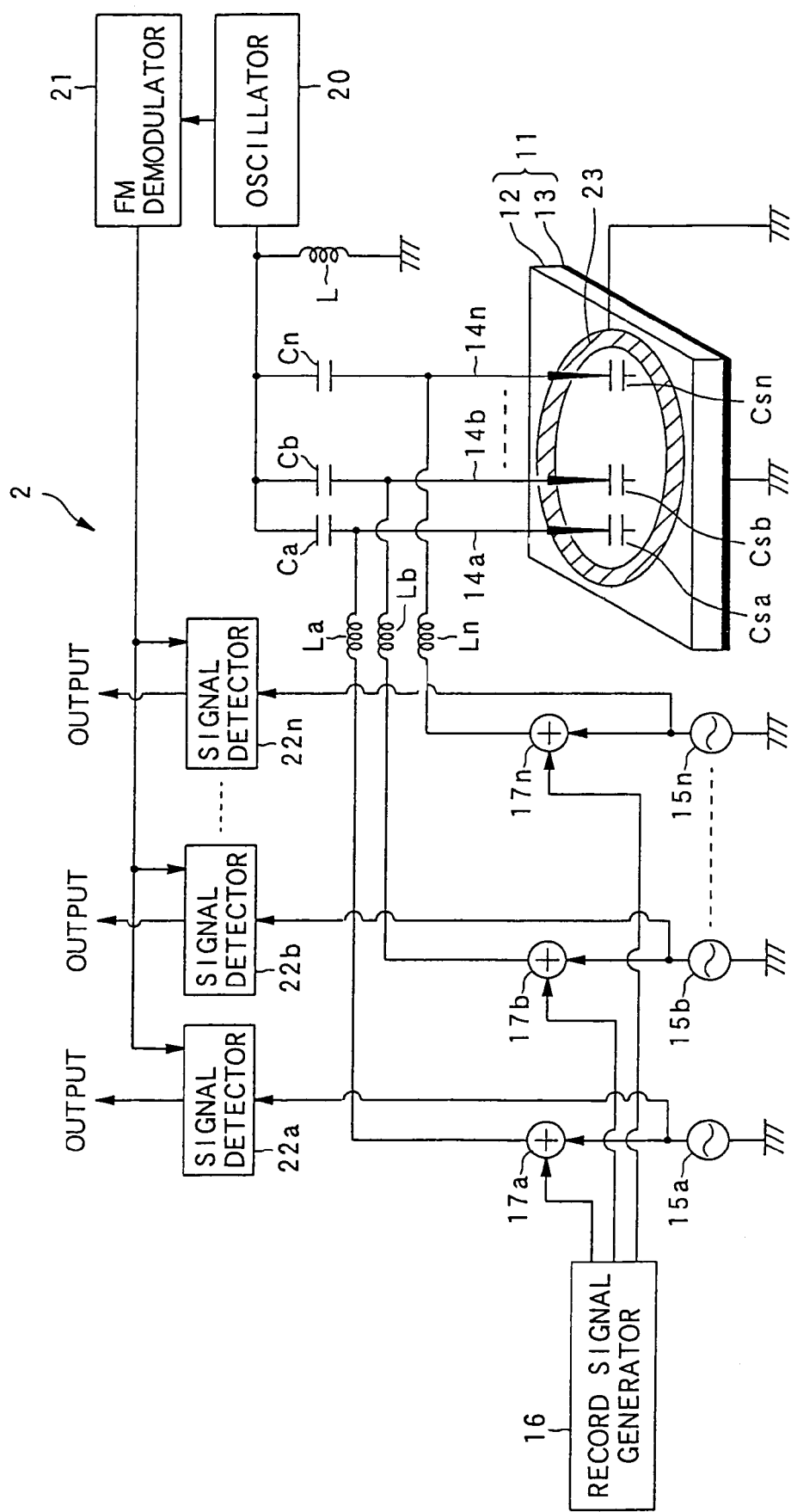
FIG. 5 is a view showing a configuration of a dielectric information apparatus in a second embodiment.

A second embodiment will be described below with reference to FIG. 5. This embodiment relates to a dielectric information apparatus that is established for recording information on a dielectric record medium and reproducing the information while recording it.

A dielectric information apparatus 2 includes: the alternating current signal generators 15a to 15n for generating the alternating current signals applied to the probes 14a to 14n; the record signal generator 16 for generating the record signals; the adders 17a to 17n for superimposing the signals from the record signal generator 16 and the signals from the alternating current signal generators 15a to 15n on each other; the inductors La to Ln for introducing the record signals to the probes 14a to 14n; the inductor L for constituting a resonating circuit together with the capacitances Csa to Csn; the oscillator 20 that oscillates on the basis of the resonance frequency of the resonating circuit; the FM demodulator 21 for demodulating the frequency-modulated oscillation signal from the oscillator 20; the signal detectors 22a to 22n for reproducing the information by synchronizing the demodulation signal from the FM demodulator 21 with the signals from the alternating current signal generators 15a to 15n; and the electrode 23 that is earthed so as to surround the probes 14a to 14n.

The operation when the information is reproduced in a condition that the information is being recorded will be described below. At first, in the recording operation, the record signals are generated by the record signal generator 16, and superimposed on the alternating current signals of the alternating current signal generators 15a to 15n, and sent to the probes 14a to 14n. The applied voltage causes the electric field to be induced between the probe 14 and the electrode 13, and the small area of the dielectric substance 12 is polarized in a direction corresponding to the signals. Consequently, the information is recorded.

When the reproducing operation is done simultaneously with the recording operation, in particular, in order to check whether or not the recording is normally carried out, the capacitance of the capacitance Cs is determined on the basis of the polarization state. The oscillator 20 oscillates at the resonation frequency of the resonating circuit including the capacitance Cs and the inductor L as the member. The signal modulated correspondingly to the change in the capacitance Cs outputted from the oscillator 20 is demodulated by the FM demodulator 21 and converted into an AM signal. This AM signal is inputted to the signal detector 22, and the alternating current signals superimposed on the record signals are also inputted. Then, the synchronous detection is done in each signal detector 22. Consequently, the information written by the respective probes 14a to 14n are instantly reproduced and outputted, respectively. Then, it is possible to check whether or not the recording is normally done.

In other points, the members and the actions according to this embodiment and the dielectric record medium 11 are similar to those described in the first embodiment.

Third Embodiment

Figure 6:
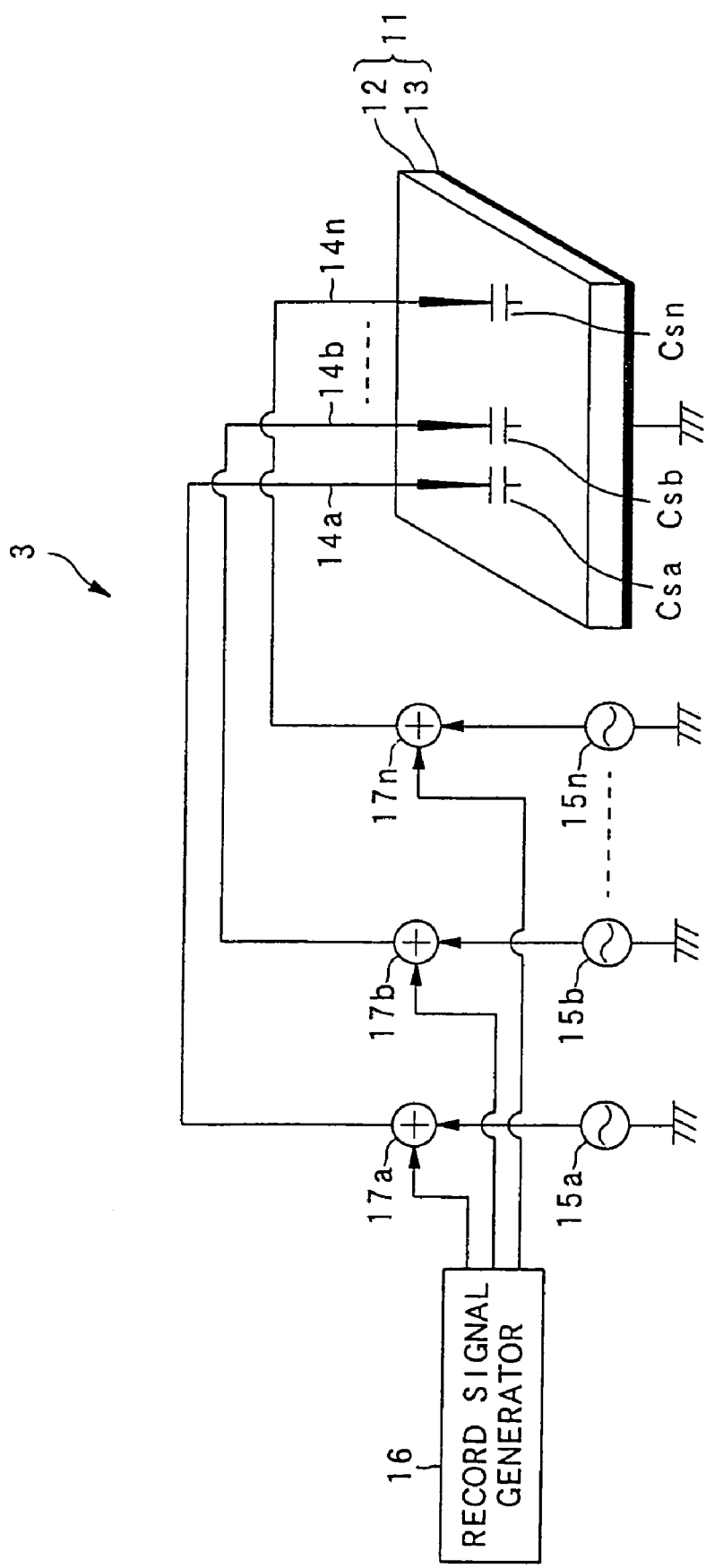
FIG. 6 is a view showing a configuration of a dielectric information apparatus in a third embodiment.

A third embodiment will be described below with reference to FIG. 6. This embodiment relates to a dielectric information apparatus that is established for recording information on a dielectric record medium.

A dielectric information apparatus 3 in this embodiment includes: the alternating current signal generators 15a to 15n for generating the alternating current signals applied to the probes 14a to 14n; the record signal generator 16 for generating the record signals; the adders 17a to 17n for superimposing the signals from the record signal generator 16 and the signals from the alternating current signal generators 15a to 15n on each other.

The record signals are generated by the record signal generator 16, and superimposed on the alternating current signals of the alternating current signal generators 15a to 15n, and sent to the probes 14a to 14n at the time of the recording. The applied voltage causes the electric field to be induced between the probe 14 and the electrode 13, and the small area of the dielectric substance 12 is polarized in the direction corresponding to the signals. Consequently, the information is recorded.

In other points, the members and the actions according to this embodiment and the dielectric record medium 11 are similar to those described in the first embodiment.

Fourth Embodiment

Figure 7:
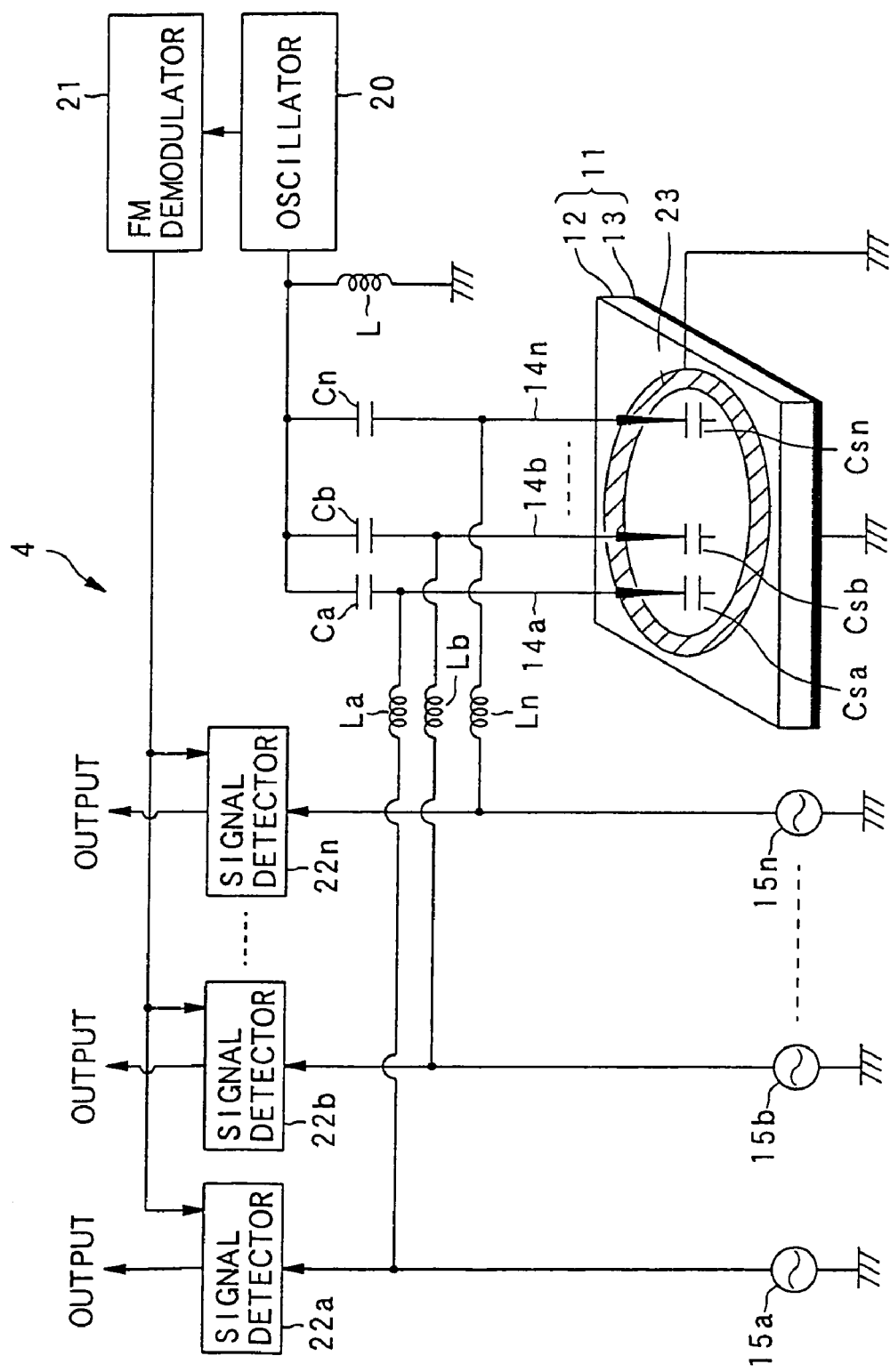
FIG. 7 is a view showing a configuration of a dielectric information apparatus in a fourth embodiment.

A fourth embodiment will be described below with reference to FIG. 7. This embodiment relates to a dielectric information apparatus that is established for reproducing the information recorded on the dielectric record medium.

A dielectric information apparatus 4 in this embodiment includes: the alternating current signal generators 15a to 15n for generating the alternating current signals applied to the probes 14a to 14n; the inductors La to Ln for introducing to the probes 14a to 14n; the inductor L for constituting the resonating circuit together with the capacitances Csa to Csn in the small area of the dielectric substance; the oscillator 20 that oscillates on the basis of the resonance frequency of the resonating circuit; the FM demodulator 21 for demodulating the frequency-modulated oscillation signal from the oscillator 20; the signal detectors 22a to 22n for reproducing the information by synchronizing the demodulation signal from the FM demodulator 21 with the signals from the alternating current signal generators 15a to 15n; and the electrode 23 that is earthed so as to surround the probes 14a to 14n.

Next, in the reproducing operation, the values of the capacitances Csa to Csn are changed from the relation between the direction of the polarization P in the corresponding small area and the direction of the alternating current electric fields applied from the probes 14, and they correspond to the information. The oscillation frequency of the oscillator 20 is changed on the basis of the values of the capacitances Csa to Csn. The information is read out by demodulating it.

The inductors La to Ln and the capacitances Ca to Cn are used to constitute a high-pass filter for cutting off a signal system so that the signals from the alternating current signal generators 15a to 15n do not interfere with the oscillation of the oscillator 20.

The oscillator 20 oscillates at the resonance frequency of the resonating circuit including the inductor L and the capacitances Csa to Csn as the member. Here, the oscillator 20 is separated from the side of the signal source by the inductors La to Ln and the capacitances Ca to Cn, as mentioned above. Thus, it is not necessary to install the oscillator for each probe. It is enough to install one oscillator.

The FM demodulator 21 performs the FM detection on the output from the oscillator 20 oscillating at the frequency corresponding to the change in the capacitances Csa to Csn, and demodulates into the amplitude signal. This demodulated signal includes the component of the alternating current signal applied to each probe, in addition to the recorded information.

Each of the signal detectors 22*a* to 22*n* separates and reproduces each alternating current signal, namely, the signal corresponding to each probe from the demodulation signal from the FM demodulator 21, by using the signal from each of the alternating current signal generators 15*a* to 15*n* as the reference signal.

As the operation for the reproducing apparatus, the alternating current signals from the alternating current signal generators 15 are applied through the inductors La to Ln to the probes 14*a* to 14*n*. The application causes the electric field to be induced between the probe 14 and the electrode 13 of the dielectric record medium 11. Then, the dielectric constant is determined from a direction of the electric field and a direction of the polarization in the small area of the dielectric substance 12 sandwiched between both of the electrodes. The oscillator 20 oscillates at the resonation frequency of the resonating circuit including this capacitance Cs and the inductor L as the member, with regard to it. The signal modulated correspondingly to the change in the capacitance Cs outputted from the oscillator 20 is demodulated by the FM demodulator 21 and converted into the AM signal. This AM signal is inputted to the signal detector 22, and the alternating current signals superimposed on the record signals are also inputted. Then, the synchronous detection is done. Consequently, the respective probes 14*a* to 14*b* separate the recorded information, respectively, and reproduce and output.

In other points, the members and the actions according to this embodiment and the dielectric record medium 11 are similar to those described in the first embodiment.

Configuration Example of Tape-like Medium Recording/Reproducing Apparatus

Figure 8:
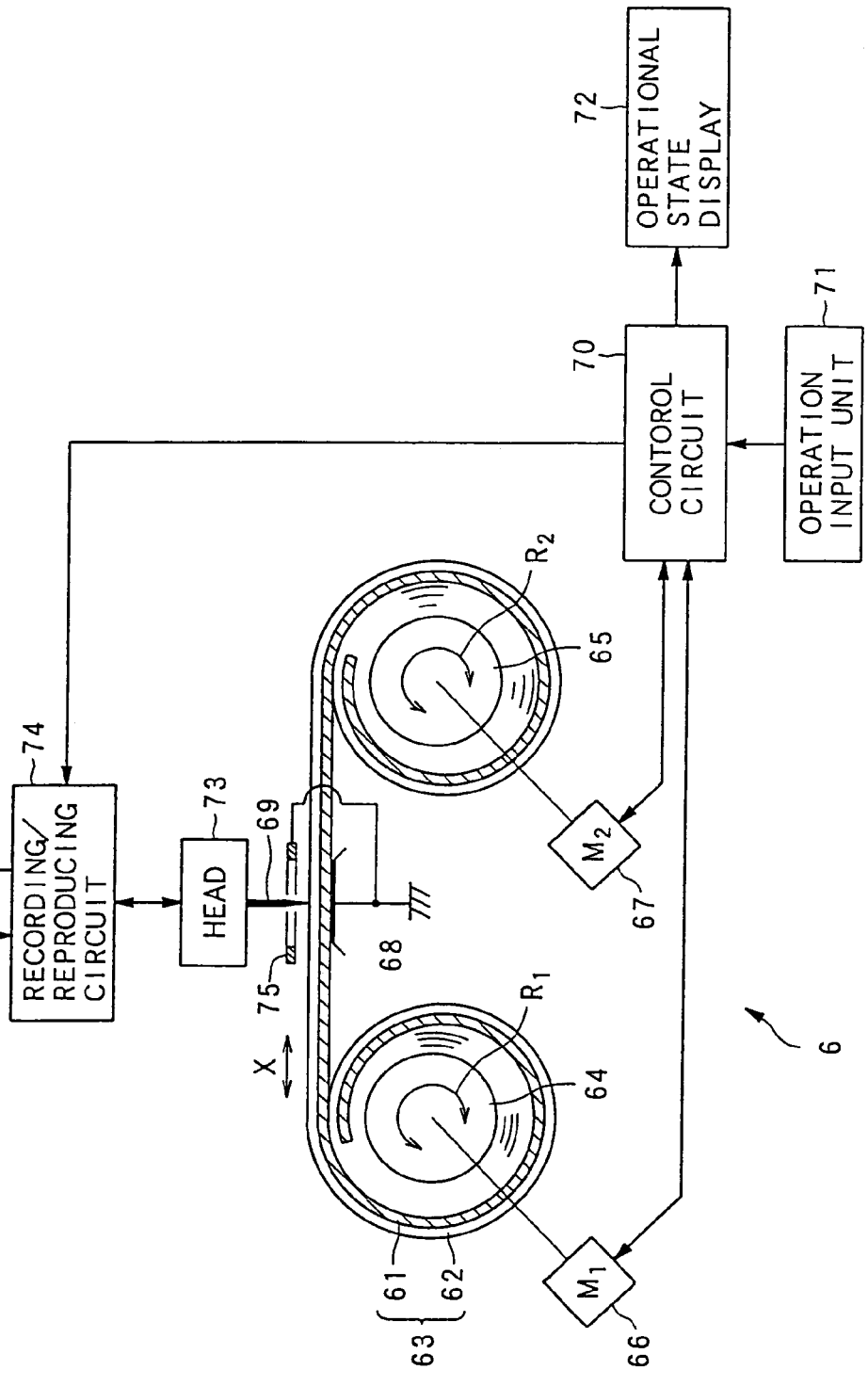
FIG. 8 is a block diagram showing a recording/reproducing apparatus in which a dielectric information apparatus of the present invention is configured by using a tape-like dielectric record medium.

A recording/reproducing apparatus using a dielectric record medium that is tape-shaped is described with reference to FIG. 8.

At first, in the schematic configuration of a recording/reproducing apparatus 6, the recording/reproducing apparatus 6 includes: a tape-like dielectric record medium 63 composed of a conductive thin film substrate 61 and a dielectric substance thin film 62 forming a recording section formed on the substrate 61 by using a predetermined method; winding shafts 64, 65; motors 66, 67 for driving the winding shafts 64, 65; a base 68 serving as a device for grounding the thin film substrate 61 of the dielectric record medium 61; probes 69; a control circuit 70; an operation input unit 71; an operational state display 72; a head 73; a recording/reproducing circuit 74, an electrode 75 which is placed so as to surround the periphery of the probes 69 and grounded, and another known mechanism required to run a tape and carry out a recording/reproducing operation.

The operation will be described below. The dielectric record medium 63 is wound in a direction of an arrow X, under the condition that it is in contact with the base 68 and the probes 69, by the winding shafts 64, 65, or sent out and run. The winding shafts 64, 65 are respectively linked to the motors 66, 67 rotated in accordance with the control signal of the control circuit 70, and they are respectively rotated in directions R1, R2 to thereby carry out the winding and sending operations. The control circuit 70 controls not only the rotations of the motors 66, 67 but also the operation of the entire apparatus. Data is inputted from various sensors (not shown) placed in the necessary portions of the apparatus so that the recording/reproducing apparatus 6 is controlled so as to be normally actuated by a programmed CPU.

Also, the control circuit 70 receives an operation indicating signal inputted from the operation input unit 71, and actuates the recording/reproducing apparatus 6 in accordance with the indication, and then displays the operational state on the operational state display 72. The input indication includes the indications similar to those of the conventional apparatus using the magnetic tape, for example, such as a selection of a recording or a reproducing, a start, a stop, a fast feeding, a rewinding and the like. Also, the operational state to be displayed includes the states similar to those of the operational displays of the conventional apparatus also using the magnetic tape, for example, such as a state currently being recorded or reproduced, a state of a fast feeding or a rewinding, an address of a current portion of the recording or reproducing operation, and the like.

Next, the head 73 has the probes 69, and includes circuits for applying or reading information to or from it. The probes 69 are placed in a direction vertical to a paper surface of FIG. 8. The circuits includes, for example, the oscillator 20, the inductor L, the capacitances Ca to Cn shown in FIG. 1 and the like. The record information sent to the head 73 and the read reproduction information are processed by the recording/reproducing circuit 74. This recording/reproducing circuit 74 includes, for example, the record signal generator 16, the alternating current signal generators 15, the FM demodulator 21 and the signal detectors 22 shown in FIG. 1 and the like. The electrode 75 is designed such that a high frequency signal oscillated by the oscillator is emitted from the probe 69 and returned back to an earth.

Incidentally, the configurations and the operations of the respective members are similar to those of the first embodiment and the like, and the similar explanations are omitted here.

As the information to be recorded, there are a picture signal and a voice signal for a television, a radio and the like, and a computer data. The reproduction output is outputted as a voice to a speaker, or outputted as a picture on a display, and used as a program and a data for a computer.

Incidentally, the apparatus having both of the recording and reproducing functions has been described as the taped-like medium recording/reproducing apparatus. However, even the apparatus having only the recording function or the apparatus having only the reproducing function can be configured by considering the function with regard to it.

(Configuration Example of Disc-like Medium Recording/Reproducing Apparatus)

Figure 9:
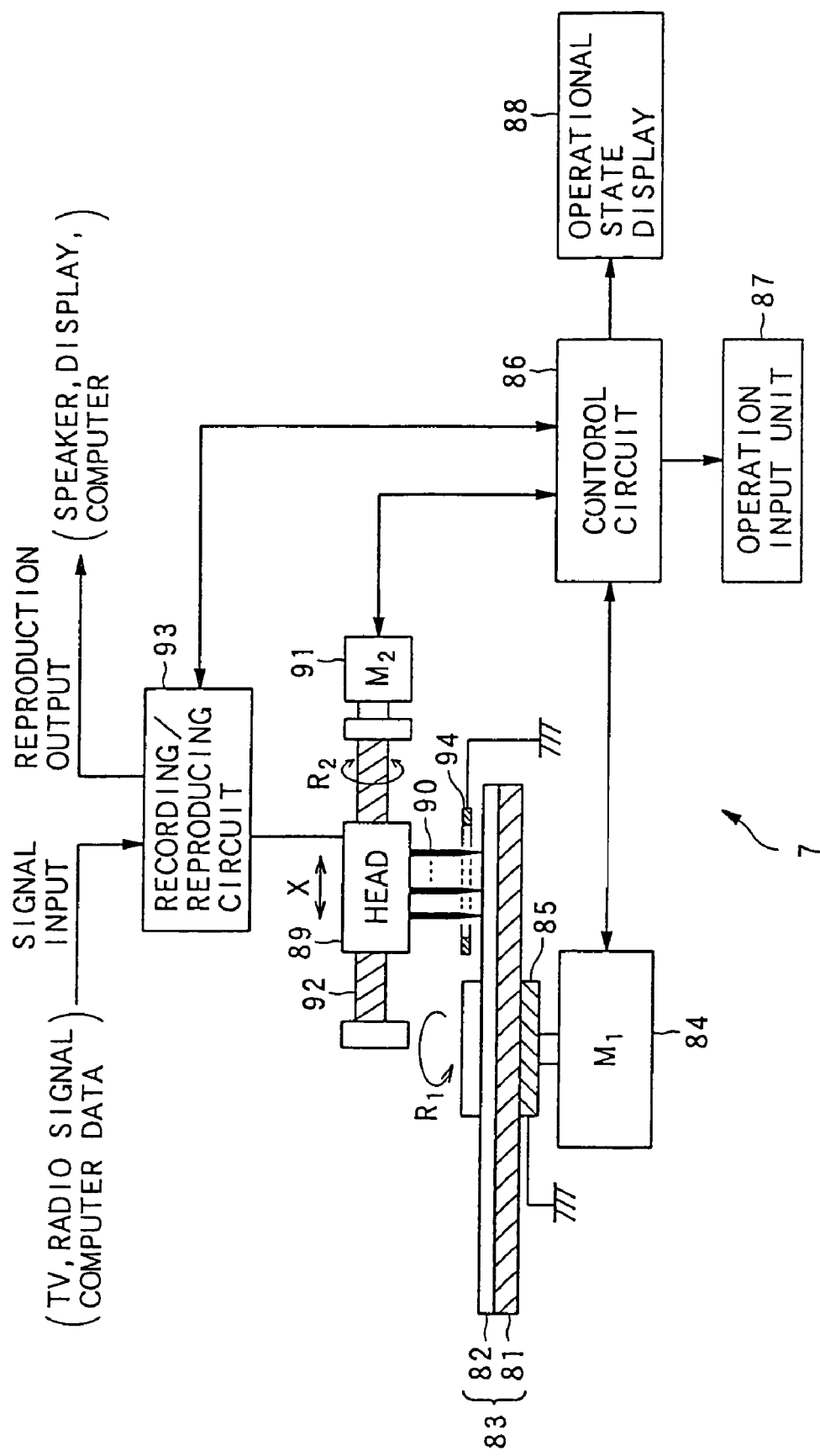
FIG. 9 is a block diagram showing a recording/reproducing apparatus in which a dielectric information apparatus of the present invention is configured by using a disc-like dielectric record medium.

A recording/reproducing apparatus using a dielectric record medium that is disc-shaped is described with reference to FIG. 9.

At first, in the schematic configuration of a recording/reproducing apparatus 7, the recording/reproducing apparatus 7 includes: a disc-like dielectric record medium 83 composed of a conductive substrate 81 and a dielectric substance thin film 82 forming a recording section formed on the substrate 81 by using a predetermined method; a motor 84 for rotating the disc; a rotation base 85 serving as a device for grounding the substrate 81 of the dielectric record medium 83; a control circuit 86; an operation input unit 87; an operational state display 88; a head 89; probes 90; a motor 91 for moving the head 89 in a radius direction of the disc; a screw 92; a recording/reproducing circuit 93, an electrode 94 which is placed so as to surround the periphery of the probes 90 and grounded, and another known mechanism required to run a disc and carry out a recording/reproducing operation.

The operation will be described below. The dielectric record medium 83 is placed on the rotation base 85, and rotated in an R1 direction by the motor 84 controlled by the control circuit 86 under electrical connection. As the method of connecting the rotating rotation base 85 to the earth, it is possible to use a known technique such as a slip ring and the like. The control circuit 86 controls the operation of the entire apparatus. Data is inputted from various sensors (not shown) placed in the necessary portions of the apparatus so that the recording/reproducing apparatus 7 is controlled so as to be normally actuated by a programmed CPU.

Also, the control circuit 86 receives an operation indicating signal inputted from the operation input unit 87, and actuates the recording/reproducing apparatus 7 in accordance with the indication, and displays the operational state on the operational state display 88. The input indication includes the indications similar to those of the conventional apparatus using the disc, for example, such as a selection of a recording or a reproducing, a start, a stop, a movement of the head 89 and the like. Also, the operational state to be displayed includes the states similar to those of the operational displays of the conventional apparatus also using the disc, for example, such as a state currently being recorded or reproduced, a position of the head, an address of a current portion of the recording or reproducing operation, and the like.

Next, the head 89 is moved in the direction illustrated by an arrow X, which is the radius direction of the dielectric record medium 83, by rotation of the screw 92 with the motor 91. This head 89 has a plurality of probes 90, and includes the circuits for applying or reading information to or from these probes 90. The circuits include, for example, the oscillator 20, the inductor L, the capacitances Ca to Cn shown in FIG. 1 and the like.

The reproduction information read by the head 89 is processed by the recording/reproducing circuit 93. This recording/reproducing circuit 93 includes, for example, the record signal generator 16, the alternating current signal generators 15, the FM demodulator 21 and the signal detectors 22 shown in FIG. 1 and the like. The electrode 94 is designed such that a high frequency signal oscillated by the oscillator is emitted from the probes 90 and returned back to an earth.

Incidentally, the configurations and the operations of the respective members are similar to those of the first embodiment and the like, and the similar explanations are omitted here.

As the recorded information, there are a picture signal and a voice signal for a television, a radio and the like, and a computer data. The reproduction output is outputted as a voice to a speaker, or outputted as a picture on a display, and used as a program and a data for a computer.

Incidentally, the apparatus having both of the recording and reproducing functions has been described as the disc-like medium recording/reproducing apparatus. However, even the apparatus having only the recording function or the apparatus having only the reproducing function can be configured by considering the function, with regard to it.

As described above in detail, the plurality of probes are installed in one oscillator, and the low frequency alternating current electric fields whose frequencies are different from each other are applied between the common grounded electrode, which is placed on one surface of the dielectric substance thin film, and the electrode composed of the plurality of probes formed so as to be brought into contact with the small area of the dielectric substance (or brought into contact through the micro gap) from the side of the probes. Consequently, the information recorded on the medium can be read out at the same time.

Also, the signal source circuit for the recording/reproducing operation and the high frequency circuit of the oscillator including the LC resonator are separated from each other by LC. Thus, there is no interference with the oscillator.

Moreover, it is enough that the power supplies for applying the low frequency alternating current electric fields can be oscillated at single frequencies different from each other. Thus, they are simple and easily integrated. One high frequency oscillator is designed such that one can be commonly used by the plurality of probes. Hence, it is possible to attain the super small type of the super high density dielectric recording/reproducing apparatus.

Incidentally, in the respective embodiments as described above, the dielectric substances constituting the dielectric record medium 11, the dielectric record medium 83 and the dielectric record medium 63 are preferably made of the ferroelectric substance. Consequently, the information can be written to the small area of the ferroelectric substance at the high density, in the further excellent manner.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

The entire disclosure of Japanese Patent Application No. 2001-274346 filed on Sep. 10, 2001 including the specification, claims, drawings and summary is incorporated herein by reference in its entirety.

What is claimed is:

1. A dielectric information apparatus for reproducing information recorded in a small area of a dielectric substance having a first surface and a second surface which are opposite to each other, comprising:
　　a first electrode that is placed so as to be in contact with the first surface of the dielectric substance and whose tip portion is a predetermined curvature;
　　a second electrode connected to the second surface of the dielectric substance;
　　an alternation signal generating device for generating an alternation signal having a predetermined frequency;
　　a signal applying device for applying the alternation signal to the first electrode;
　　a return electrode for returning a signal resulting from the applying of the alternation signal to the dielectric substance by the first electrode;
　　an oscillating device for generating an oscillation signal on the basis of a capacitance of the dielectric substance and an inductance of an inductor, the capacitance of the dielectric substance being formed between the first electrode and the second electrode and depending on a polarization state of the dielectric substance between the first electrode and the second electrode;
　　a demodulating device for demodulating the oscillation signal; and
　　a signal reproducing device for reproducing the information using a signal demodulated by the demodulating device and the alternation signal, wherein the dielectric substance is a ferroelectric substance.

2. A dielectric information apparatus according to claim 1, further comprising a cutoff device for cutting off the alternation signal with respect to the oscillating device.

3. A dielectric information apparatus according to claim 1, wherein the signal reproducing device reproduces the information by using a synchronous detection method.

4. A dielectric information apparatus according to claim 1, wherein the return electrode is earthed and is placed around the first electrode.

5. A dielectric information apparatus according to claim 1, wherein the first electrode comprises a plurality of electrodes placed at predetermined intervals.

6. A dielectric information apparatus according to claim 5, wherein the alternation signal generating device generates a plurality of the alternation signals which are different from each other and each of which is supplied to a respective one of the plurality of the first electrodes.

7. A dielectric information apparatus for reproducing information recorded in a small area of a ferroelectric dielectric substance having first and second opposed surfaces, the dielectric information apparatus comprising:
  an alternating signal source for generating an alternating signal of a specified frequency;
  a first electrode placed in contact with the first surface of the ferroelectric dielectric substance and supplied with the alternating signal;
  a second electrode connected to the second surface of the ferroelectric dielectric substance;
  an inductor;
  an oscillation device coupled to the inductor and generating an oscillation signal based on an inductance of the inductor and a capacitance of the ferroelectric dielectric substance between the first and second electrodes, the capacitance depending on a polarization state of the ferroelectric dielectric substance between the first and second electrodes;
  a return electrode for returning a signal resulting from applying the alternating signal to the ferroelectric dielectric substance by the first electrode;
  signal processing circuitry for reproducing the recorded information based on the oscillation signal.

8. A dielectric information apparatus according to claim 7, wherein the signal processing circuitry comprises:
  a demodulating device for demodulating the oscillation signal; and
  a signal reproducing device for reproducing the recorded information based on the demodulated oscillation signal and the alternating signal.

9. A dielectric information apparatus according to claim 7, further comprising:
  at least one additional first electrode, each additional electrode being supplied with a respectively corresponding alternating signal from the alternating signal source.

10. A dielectric information apparatus according to claim 7, wherein the return electrode is arranged around the first electrode.

11. A dielectric information apparatus according to claim 7, wherein the signal processing circuitry reproduces recorded analog information.

12. A dielectric information apparatus according to claim 7, wherein the signal processing circuitry reproduces recorded digital information.

13. An information reproducing apparatus comprising the dielectric information apparatus of claim 7.

14. A dielectric information apparatus according to claim 1, wherein the first and second surfaces of the dielectric substance are opposed surfaces.

15. A dielectric information apparatus according to claim 7, wherein the first and second surfaces of the ferroelectric dielectric substance are opposed surfaces.

* * * * *